(12) United States Patent
Roopan

(10) Patent No.: US 10,049,594 B2
(45) Date of Patent: Aug. 14, 2018

(54) SYSTEMS AND METHODS OF COMPETENCY ASSESSMENT, PROFESSIONAL DEVELOPMENT, AND PERFORMANCE OPTIMIZATION

(75) Inventor: Rajiv Roopan, Hoboken, NJ (US)

(73) Assignee: ATLAS, INC., North Bay Village, FL (US)

( * ) Notice: Subject to any disclaimer, the term of this patent is extended or adjusted under 35 U.S.C. 154(b) by 0 days.

(21) Appl. No.: 13/458,123

(22) Filed: Apr. 27, 2012

(65) Prior Publication Data

US 2012/0278713 A1 Nov. 1, 2012

Related U.S. Application Data

(60) Provisional application No. 61/479,723, filed on Apr. 27, 2011, provisional application No. 61/494,139, filed on Jun. 7, 2011, provisional application No. 61/553,918, filed on Oct. 31, 2011.

(51) Int. Cl.
*G06F 3/048* (2013.01)
*G09B 19/00* (2006.01)
*G06Q 10/10* (2012.01)
*G09B 7/06* (2006.01)

(52) U.S. Cl.
CPC .......... *G09B 19/00* (2013.01); *G06Q 10/105* (2013.01); *G09B 7/06* (2013.01)

(58) Field of Classification Search
CPC .... G06Q 10/1053; G06Q 10/10; G06Q 10/06; G06Q 10/00; G09B 7/04; G09B 7/00; G09B 5/00; G09B 5/14; G09B 3/00; G06G 7/48

USPC ........ 715/715, 705; 705/321; 706/45, 46, 47
See application file for complete search history.

(56) References Cited

U.S. PATENT DOCUMENTS

| | | | |
|---|---|---|---|
| 6,754,874 B1 * | 6/2004 | Richman | 715/205 |
| 2003/0187725 A1 | 10/2003 | Jotkowitz | |
| 2004/0078204 A1 * | 4/2004 | Segond | G09B 5/06 704/277 |
| 2004/0186743 A1 * | 9/2004 | Cordero, Jr. | 705/1 |
| 2004/0230410 A1 * | 11/2004 | Harless | G10L 15/26 703/6 |
| 2005/0026121 A1 | 2/2005 | Leonhard | |
| 2005/0095569 A1 * | 5/2005 | Franklin | G09B 5/00 434/350 |
| 2007/0082324 A1 | 4/2007 | Johnson et al. | |

(Continued)

OTHER PUBLICATIONS

Bartram et al. "The Great Eight Competencies: A Criterion-Centric Approach to Validation". Journal of Applied Psychology, vol. 90, No. 6, pp. 1185-1203. 2005.

*Primary Examiner* — Sang H Kim
(74) *Attorney, Agent, or Firm* — Finch & Maloney PLLC

(57) ABSTRACT

A computer system is provided. The computer system includes a memory, at least one processor coupled to the memory, and an assessment component executed by the at least one processor. The assessment component is configured to execute a conversation between at least one user and a computer-simulated character and determine a competency level displayed by the at least one user based on at least one response option received during the conversation. In the computer system, the at least one response option may include a plurality of response options and the assessment component may be configured to calculate an overall score based on the plurality of response options.

27 Claims, 24 Drawing Sheets

(56) References Cited

U.S. PATENT DOCUMENTS

| | | |
|---|---|---|
| 2007/0198317 A1 | 8/2007 | Harthcryde et al. |
| 2007/0208572 A1 | 9/2007 | Habichler et al. |
| 2008/0045286 A1 | 2/2008 | Setty |
| 2008/0124687 A1 | 5/2008 | Post |
| 2009/0138342 A1 | 5/2009 | Otto et al. |
| 2009/0276233 A1* | 11/2009 | Brimhall .............. G06Q 40/025 705/38 |
| 2010/0028846 A1* | 2/2010 | Cohen et al. ................. 434/323 |
| 2010/0159433 A1* | 6/2010 | Graham ................... G09B 7/00 434/353 |
| 2010/0233663 A1 | 9/2010 | Pennington et al. |
| 2012/0136764 A1* | 5/2012 | Miller et al. .................... 705/31 |
| 2012/0208166 A1* | 8/2012 | Ernst et al. ................... 434/353 |

\* cited by examiner

Journey, Inc Beta Platform

Play | 360 Reports | Optimize | Configure | Admin

Describe your company

Employees

Add an Employee

- Rajiv Roopan (rajiv@atlasgameworks.com)
- Braxton Bragg (braxton@atlasgameworks.com)
- Thomas McGinnis (tmcginnis@talaw.com)
- Ryan Lester (ryan@atlasgameworks.com)
- Eric Metelka (eric@atlasgameworks.com)
- Julie Weintraub (julie@atlasgameworks.com)
- Lizette Payneward (lizette@atlasgameworks.com)

Teams

Add a Team

- Team Atlas

Company Competencies

Add a Competency

- Taking Action

FIG. 4

Play Journey, Inc

Play Journey, Inc to understand your professional development needs!

In level 1 of the game, you're a new associate working at Journey, Inc. Your objectives are to work with fellow associates to accomplish company goals.

Performance Feedback Reports

These reports contain actionable feedback on the competencies measured by Level 1 of Journey, Inc.

FIG. 5

Feedback for Ryan on Taking Action journey@atlasgameworks.com
to me

Hi Rajiv,

Taking Action is very important to us here at Atlas, Inc.

How has Ryan been performing at this competency?
Your response is anonymous and very much appreciated!

○ Do much less
○ Do less
○ Perfect! Stay the same
○ Do more
○ Do much more

[Send]

FIG. 18

```
AtlasGameworks.Journey.Manager.FlowManager.prototype.initFlow_old = function () {
    var hook = [
        //xxxx
        //{type: 'story', id: 'xxxxxxxxx'}
    ];

var build = [
        {type: 'scenario', id: 'buildingRapport'},
        {type: 'scenario', id: 'customerService1'}, {type: 'story', id: 'pappMission'},
        {type: 'scenario', id: 'understandingOthers'}, {type: 'story', id: 'cindyYelling'},
        {type: 'scenario', id: 'promotingIdeas'}, {type: 'story', id: 'skydive'},
        {type: 'story', id: 'pappNewWatching'}
    ];

var tensel = [
        {type: 'story', id: 'sallyStormingOut'},
        {type: 'story', id: 'peterUpset'},
        {type: 'scenario', id: 'motivatingOthers'}, {type: 'story', id: 'maxThruRuins'},
        {type: 'scenario', id: 'negotiation'}, {type: 'story', id: 'pappHiresSally'}, //{type: 'story', id: 'newEmployeeSue'}
        //{type: 'scenario', id: 'customerService2'}
        {type: 'story', id: 'sueFrustrated'},
        {type: 'scenario', id: 'supportingOthers'}, {type: 'story', id: 'pappToAgents'},
        {type: 'story', id: 'firstHit'}
    ];
```

FIG. 19

SYSTEMS AND METHODS OF COMPETENCY ASSESSMENT, PROFESSIONAL DEVELOPMENT, AND PERFORMANCE OPTIMIZATION

RELATED APPLICATIONS

This application claims priority under 35 U.S.C. § 119(e) to U.S. Provisional Application Ser. No. 61/479,723, entitled "Assessment by Computer Game," filed on Apr. 27, 2011, which is hereby incorporated herein by reference in its entirety. This application also claims priority under 35 U.S.C. § 119(e) to U.S. Provisional Application Ser. No. 61/494,139, entitled "SYSTEMS AND METHODS FOR COMPUTER ASSISTED PROFESSIONAL DEVELOPMENT," filed on Jun. 7, 2011, which is hereby incorporated herein by reference in its entirety. In addition, this application also claims priority under 35 U.S.C. § 119(e) to U.S. Provisional Application Ser. No. 61/553,918, entitled "SYSTEMS AND METHODS FOR COMPUTER ASSISTED PROFESSIONAL DEVELOPMENT," filed on Oct. 31, 2011, which is hereby incorporated herein by reference in its entirety.

BACKGROUND

Technical Field

The technical field relates generally to competency management within an organization and, more particularly, to training, evaluating, and managing individual and collective competencies within an organization using a distributed computer system.

Background Discussion

Two methods of evaluating competencies are assessments and assessment centers. Assessments are text-based tests containing one or more direct questions. Individuals are typically asked to respond by selecting from a list of response options. Depending on the type of assessment, individuals may choose one or more of these options or may rank the options from best to worst. Assessments may present questions within a particular context. For instance, one type of context-based assessment, referred to as a situational judgment test, presents the individual with a situation in the form of text, images, or video, and requests that the individual to pick the best option. Conventional assessments are not interactive.

Assessment centers are also used to evaluate an individual's competency level. In assessment centers, individuals are asked to complete exercises created by trained professionals. These exercises are usually similar to tasks required in job settings. The exercises are typically scored by professionals who observe individuals performing the exercises. Professionals determine a score for each competency evaluated. Feedback may also be provided to the individuals taking part in the exercises.

Often results from assessments and assessment centers are used to determine the types of training provided to individuals in order to improve performance within specific competencies. Current training and development methods may include videos, simulations, and classroom instruction.

SUMMARY

Some of the aspects and embodiments disclosed herein describe a new method and system for assessing work-related skills or competencies. In one embodiment, this new method simulates a conversation between the person being assessed and one or more computer simulated and controlled characters, (e.g., simulated co-workers). In some embodiments, the conversation is conducted via simulated email or instant messaging. The conversation may include text that is spoken by the computer simulated and controlled character and text options selectable by the person being assessed to simulate two-way communication between the simulated and controlled characters and the person being assessed. In some embodiments, the content of the conversation is included in a conversation script that is created/written by professionals and is specifically designed to evaluate individuals on various competencies. The action of choosing one response option over another provides information about the person's relative standing on the competencies being evaluated. The conversation script spoken by the computer simulated and controlled characters may be rendered as text or audio.

In one embodiment, the conversation can start with a computer simulated and controlled character or the person being assessed. Where the person being assessed starts the conversation, dialogue options will be displayed for the person being assessed. Otherwise a computer simulated and controlled character may begin the conversation. Options may be displayed to allow the person being assessed to respond to a computer simulated and controlled character. Depending on the option selected by the person being assessed, the computer simulated and controlled character may respond differently. The computer simulated and controlled characters may exhibit gestures corresponding to what they are saying to create a more compelling experience. The dialogue may continue back and forth between the characters and the person being assessed to simulate a discussion. Scores are associated with each response option and those scores may be used to determine the outcome of the scenario. The selected options and their corresponding scores are recorded and may be used to generate a performance feedback report and may also be used to determine an overall score for each competency and other report information. The methodology for assessing the person's performance may differ between scenarios. For example, the "Negotiation" competency may be more important than the "Understanding Others" competency, and its formula for determining performance may differ to reflect its importance.

In one embodiment, story scenes portray parts of a simulation's story in a visual manner. There can be zero or more story scenes in the simulation. A simulation may not have a story and thus may have no story scenes. The execution of a story scene can be event-based or time-based. For example, a story scene can be executed after a scenario or another story scene has finished or can have a defined time of execution.

Scenarios and story scenes can be comprised of one or more, but not limited to, the following: artwork, text, sounds, music, assessment items in the form of a conversation script, or executable computer instructions. The system may load scenarios and story scenes all at once, or as needed. The system may present the person being assessed with scenarios and/or story scenes depending on the scenario's defined method of execution. The sequence of scenarios and/or story scenes may change depending on how well the person being assessed performs within the given scenarios. The system may or may not execute all defined scenarios and story scenes.

In some embodiments, the system tracks a variety of metrics during execution of a simulation. In these embodiments, the system may record any one of, but not limited to, the following: responses made by the person being assessed, the time that scenario execution started, the time that scenario execution finished, the time elapsed between display of an item until a response is recorded. The system stores this data in memory and may store none, some, or all of it in a database or some other data storage device. In some embodiments, the system interprets this information as one or more additional factors that contribute to the overall score determined for each competency. For example, the system may decrease the overall score for a competency if the total scenario duration reaches a threshold or if the time elapsed between display of an item and receipt of a response reaches a threshold.

In one embodiment, if a simulation contains multiple levels; the person being assessed will be able to move to the next level depending on their performance in completing the scenarios in the previous level. After each level or the entire simulation is finished, the system makes available a performance feedback report with scores and/or awards. The report may also contain actionable feedback if necessary. The content included in the actionable feedback is dependent on the score or award the person being assessed receives for each competency.

According to one embodiment, a computer system is provided. The computer system includes a memory, at least one processor coupled to the memory, and an assessment component executed by the at least one processor. The assessment component is configured to execute a conversation between at least one user and at least one computer-simulated character and determine a competency level displayed by the at least one user based on at least one response option received during the conversation. In the computer system, the at least one computer simulated character may include a plurality of computer-simulated characters. The at least one response option may includes a plurality of response options and the assessment component may be further configured to calculate an overall score based on the plurality of response options.

The computer system may further include a report component executed by the at least one processor. The report component may be configured to generate a report indicating the competency level displayed. The conversation may include one or more discrete communications. The one or more discrete communications may include simulated speech rendered as at least one of text and audio. The one or more discrete communications may include a plurality of response options. The one or more discrete communications may include a plurality of discrete communications iteratively conducted according to a path through a plurality of branches.

The computer system may further include an administrative component executed by the at least one processor. The administrative component may be configured to receive organizational information descriptive of an organizational structure including a plurality of members and receive competency information descriptive of competencies associated with at least one organizational unit. In the computer system, the user may be a member of the plurality of members and the at least one computer-simulated character may include at least one of a co-worker, supervisor, subordinate, customer, and vendor.

The computer system may further include a feedback component executed by the at least one processor. The feedback component may be configured to send a communication to a member of the plurality of members, the communication including information requesting feedback regarding the at least one member and receive a response to the communication. The feedback component may be further configured to determine the member based on an organizational relationship between the member and the at least one member. The response may include feedback information regarding at least one competency associated with the at least one member. The response may include award information descriptive of an award recommended for the at least one member.

According to another embodiment, a method of managing competency information using a computer system is provided. The method includes acts of executing, by the computer system, a conversation between at least one user and at least one computer-simulated character and determining a competency level displayed by the at least one user based on at least one response option received during the conversation. In the method, the act of executing the conversation may include an act of executing a conversation between the at least one user and a plurality of computer-simulated characters. The at least one response option may include a plurality of response options and the method may further comprise an act of calculating an overall score based on the plurality of response options.

The method may further include an act of generating a report indicating the competency level displayed. In the method, the act of executing the conversation may include an act of executing one or more discrete communications. The act of executing the one or more discrete communications may include an act of rendering simulated speech as at least one of text and audio. The act of executing the one or more discrete communications may include an act of providing a plurality of response options. The act of executing the one or more discrete communications may include an act of iteratively conducting the one or more discrete communications according to a path through a plurality of branches.

The method may further include acts of receiving organizational information descriptive of an organizational structure including a plurality of members and receiving competency information descriptive of competencies associated with at least one organizational unit. In the method, the user may be a member of the plurality of members and the act of executing the conversation may include an act of executing a conversation between the at least one user and at least one of a co-worker, supervisor, subordinate, customer, and vendor.

The method may further include acts of sending a communication to a member of the plurality of members, the communication including information requesting feedback regarding at least one member and receiving a response to the communication. The method may further comprise an act of determining the member based on an organizational relationship between the member and the at least one member. The act of receiving the response may include an act of receiving feedback information regarding at least one competency of the at least one member. The act of receiving the response may include an act of receiving award information descriptive of an award recommended for the at least one member.

According to another embodiment, a non-transitory computer readable medium is provided. The computer readable medium stores instructions for managing competency information within a computer system. The instructions are encoded to instruct at least one processor to execute a conversation between at least one user and at least one computer-simulated character and determine a competency level displayed by the at least one user based on at least one response option received during the conversation.

According to another embodiment, a computer system is provided. The computer system includes a memory, at least one processor coupled to the memory, an administrative component executed by the at least one processor, and an assessment component executed by the at least one processor. The administrative component is configured to receive organizational information descriptive of an organizational structure including a plurality of members and receive competency information descriptive of competencies associated with at least one organizational unit defined in the organizational structure. The assessment component is configured to execute a conversation between at least one member of the plurality of members and a computer-simulated character, determine a competency level displayed by the at least one member based on the conversation, and associate the competency level displayed with the at least one member.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 4 is an illustration of a user interface provided by an administrator interface component;

FIG. 5 is an illustration of a user interface provided by a member interface component;

FIG. 18 is an illustration of an exemplary feedback request email;

FIG. 19 is an illustration of exemplary flow data;

DETAILED DESCRIPTION

Figure 1:
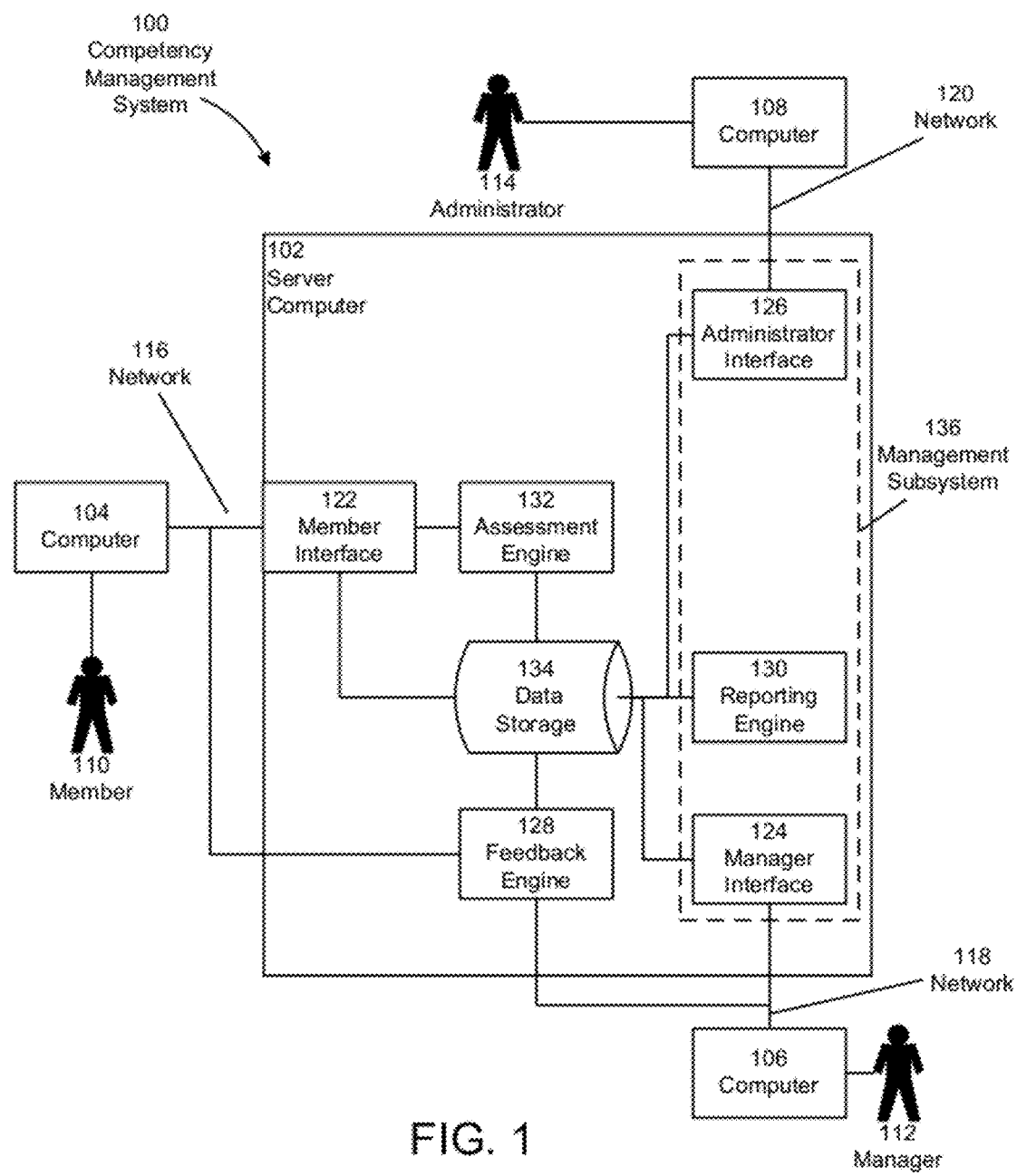
FIG. 1 is a context diagram of a competency management system.

At least one embodiment disclosed herein provides a professional development and performance optimization platform that assesses competencies of individual members (e.g., employees) of an organization and that facilitates management of the organizational units to which the members belong. In some embodiments, the professional development and performance optimization platform includes three primary components: a training and assessment component, a management component, and a feedback component.

According to one embodiment, the training and assessment component executes a computer simulation that, when conducted by a member, will assess the member's proficiency within a particular, predefined set of competencies. In some embodiments, the assessment component assesses competencies via an interactive entertainment experience. In these embodiments, the simulation includes a game. The game may include one or more levels. While the member is playing the game, the assessment component presents the member with one or more scenarios. Each scenario is associated with, and is designed to assess the member's performance within, one or more competencies. As such, scenarios define the methodology used to assess member proficiency within one or more competencies.

According to one embodiment, the training and assessment component measures proficiency within each competency associated with a scenario by simulating a conversation that includes a variety of interactions, recording member responses provided during these interactions, and using those responses to generate an overall score. A scenario's execution may be event-based or time-based. For example, a scenario may be executed at the end of a story scene and it may be executed after a certain amount of time has elapsed in the simulation. A scenario may have a defined completion time or method. For example, a scenario may be recorded as complete when all conversations have finished or may be recorded as complete after a predetermined amount of time has elapsed since the scenario started. A scenario's presentation does not have to be presented to the member in a visual manner. For example, a scenario to evaluate a competency may not require a conversation script and may be running in the background to evaluate how quickly a member completes a certain task.

In some embodiments, after a simulation or each portion of the simulation is completed, the assessment component stores competency information descriptive of the member's performance and competencies within a data storage, thereby making the data available for subsequent processing by the management component. This competency information may include feedback, awards, and scores for each competency assessed.

In another embodiment, the management component includes one or more administrative interfaces that receive configuration information from authorized administrative users. This configuration information may be descriptive of one or more organizational structures associated with an authorized administrative user. For instance, this configuration information may specify the company, department, and team structure of the organization to which the authorized administrative user belongs. The configuration information may specify employees or other individuals that make up the organization and competency models used within the organization. Furthermore, the configuration information may specify roles within the organization and associate roles with proficiency levels of competencies needed to perform the role.

According to another embodiment, the management component includes one or more interfaces that provide authorized users with performance feedback reports generated by a reporting engine and based on data gathered and stored by the assessment component or the feedback component describe below. These interfaces may provide a variety of competency reports by individual, team, department, and organization. These reports provide insight into how to structure the organization's teams and departments and allow managers to better manage their teams. Managers are also able to use the data displayed in these reports to make hiring decisions and to identify individual, team, department, and company competencies. In some embodiments, the management component may include one or more interfaces that receive status updates from members, receive indications that other users wish to follow an identified member or group of members, and provide, to the other users, status updates received from the identified member or group of members.

In another embodiment, the feedback component includes one or more interfaces that receive feedback information descriptive of an assessed member's competency set. This feedback component gathers feedback for members so that they can understand their performance on a continual basis. In one embodiment, the feedback component sends email to the member's teammates, managers, and subordinates. Members that receive the feedback request emails, called feedback reporters, are presented with a HTML form in the email that asks one or more questions about the member's performance. The email received by a feedback reporter may present options that are dependent on the question or competency being reviewed. The feedback information may include comments, award information descriptive of awards recommended for the member, and points directed to one or more competencies. In some embodiments, reports are then created based on the responses from the feedback reports. These reports may be available for the member via a user interface. Reports may also be sent to the member via email. The frequency of the feedback request emails and report emails can be customized. One advantage of the feedback component is that it's not intrusive to the member's daily work.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Competency Management System

Some embodiments disclosed herein implement a competency management system using one or more computer systems, such as the computer systems described below with reference to FIG. 3. According to these embodiments, a competency management system assesses and reports individual and collective competencies of persons and groups within a defined organizational structure. FIG. 1 illustrates an exemplary competency management system 100. As shown, FIG. 1 includes a server computer system 102, a member 110, a manager 112, an administrator 114, computer systems 104, 106, and 108, and networks 116, 118, and 120. The server computer 102 includes a member interface 122, a feedback engine 128, an assessment engine 132, data storage 134, and a management subsystem 136. The management subsystem includes a manager interface 124, an administrator interface 126, and a reporting engine 130. These and other components of the exemplary competency management system 100 function as follows.

As depicted in FIG. 1, the computer systems 104, 106, and 108 and the server computer system 102 exchange (i.e. send or receive) information via the networks 116, 118, and 120. The networks 116, 118, and 120 may include any communication network through which computer systems exchange information. For example, the networks 116, 118, and 120 may be a public network, such as the internet, and may include other public or private networks such as LANs, WANs, extranets, intranets, and cloud computing systems. Although shown as three separate networks in FIG. 1, in some embodiments, the networks 116, 118, and 120 belong to a single communication network.

Within the management subsystem 136 of the server computer 102, the administrator interface 126 is configured to implement one or more user interfaces through which the management subsystem 136 exchanges information with the computer system 108 via the network 120. These user interfaces (as well as the user interfaces implemented by the manager interface 124 and the member interface 122, which are described further below) may be implemented using a variety of technologies and may include sundry elements (e.g., screens, windows, buttons, boxes, etc . . . ) arranged according to various user interface metaphors. In one embodiment, the administrator interface 126 is configured to serve a browser-based user interface to the administrator 114 that is rendered by a web-browser running on the computer system 108. In this embodiment, the administrator interface 126 exchanges information with the administrator 114 via these user interfaces and stores information reflective of the exchanged information within the data storage 134.

According to various embodiments, the administrator interface 126 is configured to provide a wide range of functionality. For instance, according to one embodiment, the administrator interface 126 is configured to provide an applicant user interface that exchanges application information with an applicant who wishes to use the competency system 100. Examples of applicants may include businesses and educational institutions, among others. The application information exchanged via the applicant user interface may include data descriptive of the administrator, company, requested license, and method of payment. Upon approval of the application information, the applicant is provided account information and logon credentials through which the administrator may logon onto the competency management system 100 as an authorized administrator, such as the administrator 114 shown in FIG. 1.

In another embodiment, the administrator interface 126 is configured to provide an administrative user interface that exchanges configuration information with an authorized administrator, such as the administrator 114. This configuration information may include information descriptive of organizational structures (including organizational hierarchies having a plurality of tiered units that associate members with teams, teams with departments, etc . . . ), roles, individual members, and permissions granted to members or other organizational units. Upon receipt of this configuration information, the administrator interface 126 stores information within the data storage 134 that reflects, and implements any changes specified in, the configuration information received. For example, where the configuration information received specifies changes to the organizational structure, roles, members, or permissions, the administrator interface 126 stores information within the data storage 134 that implements the specified changes. Thus, using the administrative user interface, the administrator 114 can cause the administrator interface 126 to maintain (i.e., add, remove, modify, and associate) logical entities within the competency management system 100 such as members (e.g., employees), teams, departments (or other organizational units), organizations, roles (e.g., team member, employee manager, competency manager, team manager, department manager, etc . . . ), and competency models. One example of an administrative user interface is illustrated in FIG. 4. In this example, the administrative user interface includes elements that receive member (e.g., employee) information and team information.

In another embodiment, the administrator interface 126 is configured to provide a feedback configuration user interface that exchanges feedback configuration information with an authorized administrator, such as the administrator 114. This feedback configuration information may include information descriptive of the members and competencies for which feedback information should be collected, the frequency with which assessment of a competency is planned and requested by the feedback engine 128, and whether the feedback engine 128 should start, pause, or stop collection of feedback information. Responsive to receipt of this feedback configuration information, the administrator interface 126 stores information within the data storage 134 that reflects, and implements any changes specified in, the feedback configuration information received. For example, where the feedback configuration information received specifies that the feedback engine 128 should stop collection of feedback information, the administrator interface 126 stores information within the data storage 134 that implements the specified changes. Thus, using the administrative user interface, the administrator 114 can configure the behavior of the feedback engine 128.

Depending on the information being stored within the data storage 134, the administrator interface 126 may take additional actions. For example, according to one embodiment, when adding a new member, the administrator interface 126 issues a communication (e.g., an email, instant message, text message, etc . . . ) to the new member including a link to a simulation user interface provided by the competency management system 100. One example of a link to a simulation user interface is illustrated in FIG. 5. In other embodiments, this communication may further include logon credentials that the new member may use to access a member user interface provided by the competency management system 100. Both the simulation user interface and the member user interface are described further below.

Within the server computer 102, the member interface 122 is configured to implement one or more user interfaces through which the server computer 102 exchanges information with the computer system 104 via the network 116. In one embodiment, the member interface 122 is configured to serve a browser-based user interface to the member 110 that is rendered by a web-browser running on the computer system 104. In this embodiment, the member interface 122 exchanges information with the member 110 via these user interfaces and stores information reflective of the exchanged information within the data storage 134.

In some embodiments, the member interface 122 is configured to provide a member user interface that exchanges member information with an authorized member, such as the member 110. This member information may include information descriptive of the authorized member's profile, such as the name, logon credentials, and stored assessment information (e.g., progress made through one or more scenarios). Upon receipt of this member information, the member interface 122 stores information within the data storage 134 that reflects, and implements any changes specified in, the member information received. For example, where the member information received specifies changes to the profile associated with a member, member interface 122 stores information within the data storage 134 that implements the specified changes. Thus, using the member user interface, the member 110 can cause the member interface 122 to maintain (i.e., add, remove, modify, and associate) logical entities associated with the member within the competency management system 100.

In other embodiments, the member user interface provides an element through which the member interface 122 receives an indication to execute a simulation. Responsive to receiving this indication, the member interface 122 executes a simulation user interface that issues a request to the assessment engine 132 to execute a simulation. Aspects of the assessment engine 132 and the member interface 122 relevant to simulations are described further below with reference to FIG. 2.

In some embodiments, after proper authentication, members associated with specific roles are able to perform certain managerial functions via the manager interface 124. Within the management subsystem 136 of the server computer 102, the manager interface 124 is configured to implement one or more user interfaces through which the management subsystem 136 exchanges information with the computer system 106 via the network 118. In one embodiment, the manager interface 124 is configured to serve a browser-based user interface to the manager 112 that is rendered by a web-browser running on the computer system 106. In this embodiment, the manager interface 124 exchanges information with the manager 112 via these user interfaces and stores information reflective of the exchanged information within the data storage 134.

According to some embodiments, the manager interface 124 is configured to provide members associated with managerial roles with managerial access to the competency management system 100. For instance, according to one embodiment, the manager interface 124 is configured to provide a team manager user interface that exchanges team information with an authorized team manager, such as the manager 112. This team information may include information descriptive of a team, members who constitute a team, the manager of the team, the company to which the team belongs, or the department (or other organizational units) to which the team belongs. Upon receipt of this team information, the manager interface 124 stores information within the data storage 134 that reflects, and implements any changes specified in, the team information received. For example, where the team information received specifies changes to the members teams included in a team, manager interface 124 stores information within the data storage 134 that implements the specified changes. Thus, using the team manager user interface, the manager 112 can cause the manager interface 124 to maintain (i.e., add, remove, modify, and associate) logical entities associated with teams within the competency management system 100.

According to another embodiment, the manager interface 124 is configured to provide a member manager user interface that exchanges member information with an authorized member manager, such as the manager 112. This member information may include information descriptive of a member (e.g., an employee), such as the name, logon credentials, roles associated with the member, and stored assessment information (e.g., progress made through one or more scenarios). Upon receipt of this member information, the manager interface 124 stores information within the data storage 134 that reflects, and implements any changes specified in, the member information received. For example, where the member information received specifies changes to the role or roles associated with a member, manager interface 124 stores information within the data storage 134 that implements the specified changes. Thus, using the member manager user interface, the manager 112 can cause the manager interface 124 to maintain (i.e., add, remove, modify, and associate) logical entities associated with members within the competency management system 100.

According to another embodiment, the manager interface 124 is configured to provide a competency manager user interface that exchanges competency configuration information with an authorized competency manager, such as the manager 112. This competency configuration information may include information descriptive of any a competency within the overall competency model of the organization, the roles with which the competency is associated and the targeted proficiency levels for the competency within each associated role. In one embodiment, information descriptive of a competency includes a name and description of the competency. Further, information descriptive of a competency may indicate that the competency pertains, for example, to a general skill, a broad set of skills, or a precisely defined skill. Thus competencies within the competency management system 100 may define a wide range of skills and skill levels. In one embodiment, the assessment engine 126 is configured to evaluate a set of precisely defined competencies. In another embodiment, the feedback engine 128 is configured to evaluate a set of more general competencies.

Upon receipt of this competency configuration information, the manager interface 124 stores information within the data storage 134 that reflects, and implements any changes specified in, the competency configuration information received. For example, where the competency configuration information received specifies changes to the targeted proficiency level of a competency associated with a role, manager interface 124 stores information within the data storage 134 that implements the specified changes. Thus, using the competency manager user interface, the manager 112 can cause the manager interface 124 to maintain (i.e., add, remove, modify, and associate) logical entities associated with the competency model specified for an organization within the competency management system 100.

In some embodiments, the competency model of an organization includes a set of competencies for each organizational unit defined within the organizational structure (e.g., members, teams, departments, and the organization as a whole). Competencies included in the competency model may be specific (e.g., email-based customer service skills) or general (e.g., leadership, ability to run a company, etc . . . ). In at least one embodiment, the competency model includes several discrete collections of competencies, with one collection being evaluated by the assessment engine 132 and another collection being setup via the administrator interface 126 and evaluated via the feedback engine 128. In this embodiment, the competency configuration information includes information mapping both collections of competencies into the overall competency model. The overall competency model may be organized into a hierarchy in which specific competencies, which may be more frequently assessed by the assessment engine 132, roll-up into more general competencies, which may include feedback information gathered via the feedback engine 128.

According to another embodiment, the manager interface 124 is configured to provide a report manager user interface that exchanges report configuration information with an authorized report manager, such as the manager 112. This report configuration information may include information descriptive of any report generated by the reporting engine 130, such as members authorized to run or view a report, scheduled report generation, and report options. Upon receipt of this report configuration information, the manager interface 124 stores information within the data storage 134 that reflects, and implements any changes specified in, the report configuration information received. For example, where the report configuration information received specifies changes to the scheduled run time of a batch report, manager interface 124 stores information within the data storage 134 that implements the specified changes. Thus, using the report manager user interface, the manager 112 can cause the manager interface 124 to maintain (i.e., add, remove, modify, and associate) logical entities associated with reports generated by the report engine 130.

Figure 6:
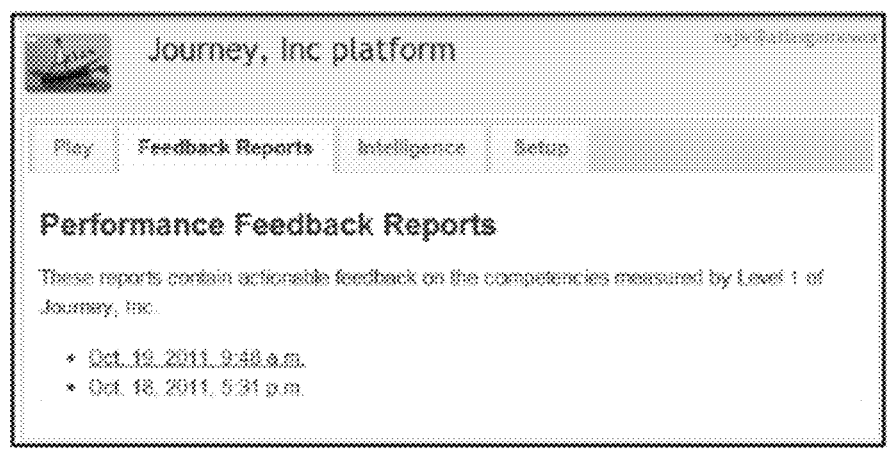
FIG. 6 is another illustration of a user interface provided by a member interface component.

In some embodiments, the member interface 122, the manager interface 124, and the administrator interface 126 implement common features. For instance, in at least one embodiment, the member interface 122, the manager interface 124, and the administrator interface each implement a report viewer interface that presents the report information, rendered in the form of one or more reports, to authorized members. FIG. 6 illustrates one example of a report viewer interface that is configured to provide access to performance feedback reports. The reports generated by the reporting engine 130 are described further below.

Within the management subsystem 136 of the server computer 102, the reporting engine 130 exchanges information with the data storage 134. The reporting engine 130 is configured to generate and store report information in the data storage 134. In some embodiments, the reporting engine 130 generates report information according to a periodic schedule as defined by the report configuration information described above with reference to the report manager user interface. In other embodiments, the reporting engine 130 generates report information responsive to receiving a request to generate reports from another component of the competency management system 100, such as the member interface 122, the manager interface 124, the administrator interface 126, the feedback engine 128 or the assessment engine 132. In some embodiments, this request may take the form on an inter-process communication. In other embodiments, the request may take the form of information stored in the data storage 134, such as where the feedback engine 128 stores new feedback information in the data storage 134. The report information generated by the reporting engine 130 may reflect data generated by the assessment engine 132 and the feedback engine 128. The reporting information stored in the data storage 134 may be viewed in the form of reports that are specific to any organizational unit (e.g. individual members, teams, departments, or the organization as a whole).

Figure 7:
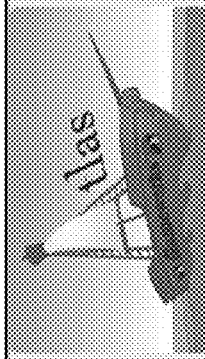
FIG. 7 is an illustration of a feedback report provided by a user interface component.
Figure 8:
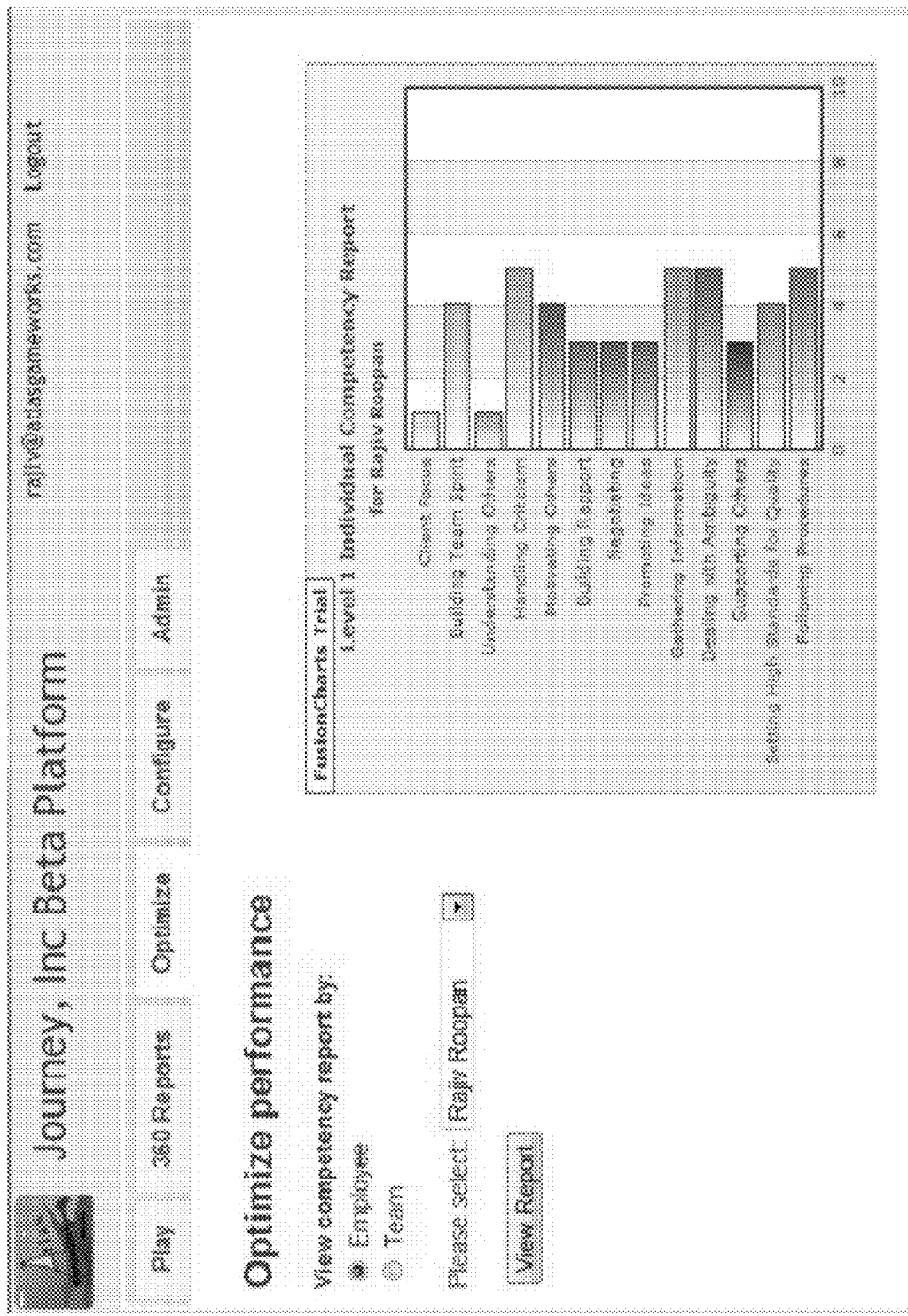
FIG. 8 is an illustration of a competency report provided by a user interface component.

FIGS. 7 and 8 illustrate two exemplary reports rendered from report information generated by the reporting engine 130. FIG. 7 illustrates a competency report according to one embodiment. As shown, the competency report reflects an assessed competency score by individual member (e.g., employee) or aggregated to larger organizational units (e.g., team or department). Competency reports provide insight into improving the structure of the organization's teams, departments, or other units. For example, where a report by team shows that everyone on a team scored poorly at the "making decisions" competency then managers can use this information to restructure the team. The reports also allow managers to better understand, and thus better manage, their team. For example, where members on a team scored poorly at "communication," team managers can use this information to properly focus feedback to those specific team members. The reports also show differences between a targeted or planned team competency structure and the assessed competency structure.

FIG. 8 illustrates a performance feedback report according to another embodiment. Performance feedback reports may include a list of the competencies assessed, a score that characterizes the assessed proficiency in each competency listed and feedback for the competency. In some embodiments, the performance feedback report also includes one or more awards. The performance feedback reports may also contain actionable feedback, if necessary. The information included in the actionable feedback given is dependent on the score or award the member receives for each competency and provides guidance to the member on how to improve their performance.

Feedback reports provide insight into the strengths and weaknesses for the assessed competencies. In some embodiments, feedback reports also include comparison information that juxtaposes a member's overall and/or response competency scores to a mean of other member's scores. In addition, the feedback reports may present the range of scores including several intervals and the number of members that scored within each interval in the range.

Figure 2:
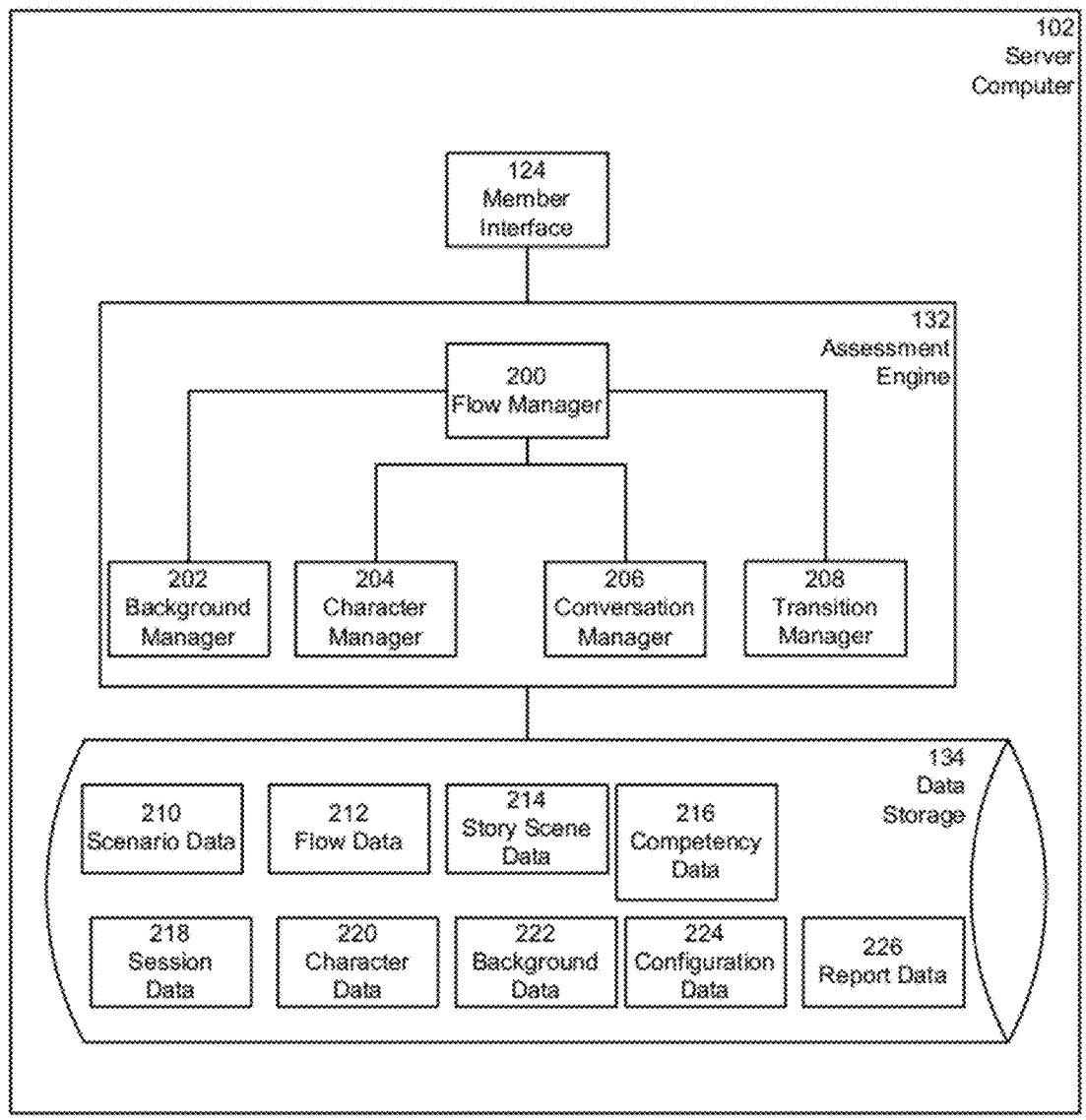
FIG. 2 is a schematic diagram of component included within a server computer that is a part of the competency management system illustrated in FIG. 1.

Within the server computer 102, the assessment engine 132 exchanges information the member interface 122, the reporting engine 130, and the data storage 134. In some embodiments, the assessment engine 132 is configured to execute a simulation that assesses one or more competencies of an individual member of an organization. This simulation may be a game. In some embodiments, the assessment engine 132 provides the simulation to a member, such as the member 110, via a simulation user interface provided by the member interface 122. It is to be appreciated that, in some embodiments, a user may access the simulation interface without holding a member account on the competency management system. In these embodiments, where the user conducts a simulation, the results are stored in association with an identifier of the user, and these results may be reviewed managerial personnel. FIG. 2 illustrates the configuration of the assessment engine 132 in greater detail.

Figure 9:
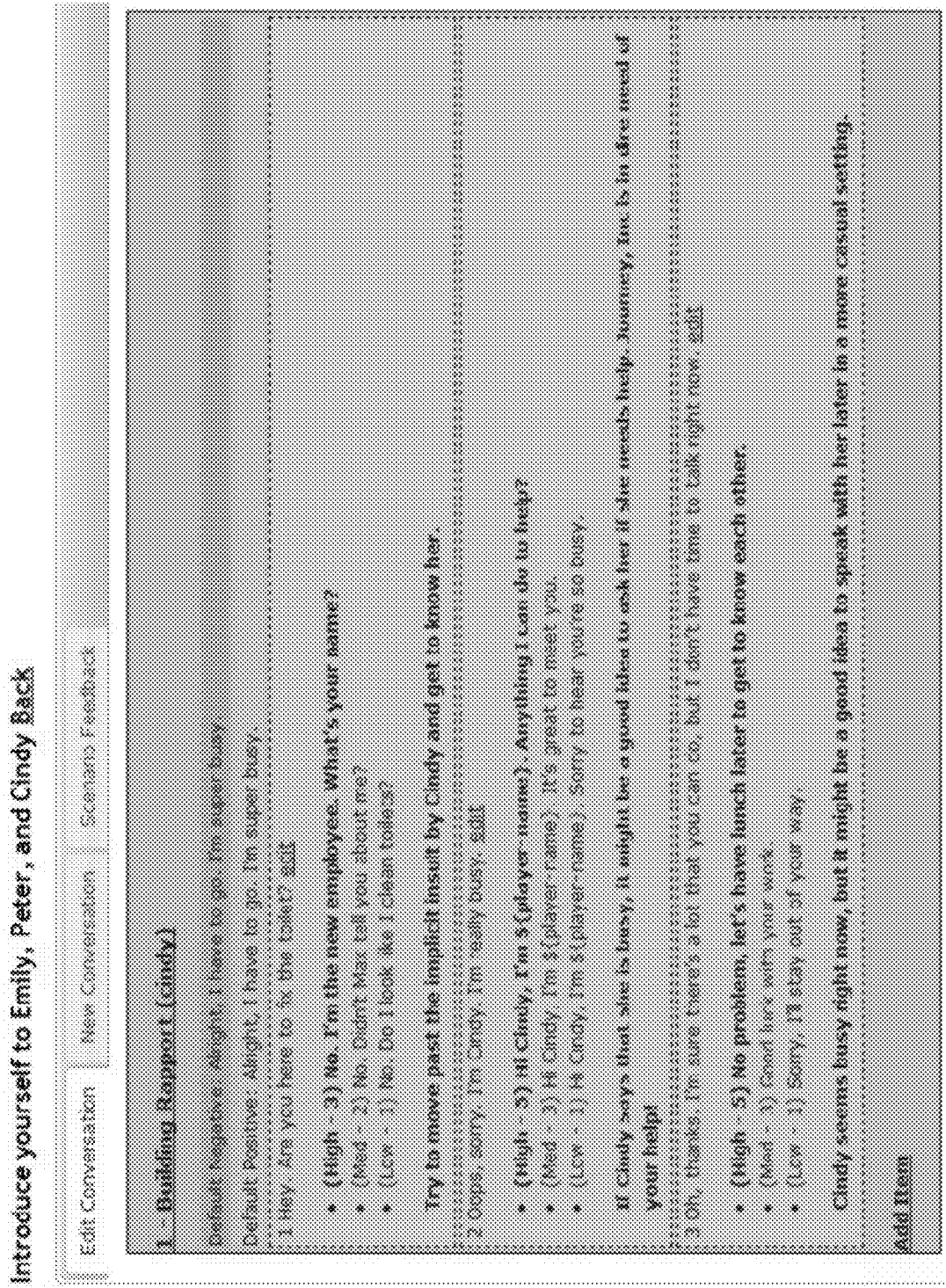
FIG. 9 is an illustration of conversation dialogue provided by a user interface component.

As shown in FIG. 2, the data storage 134 includes scenario data 210, flow data 212, story scene data 214, competency data 216, session data 218, character data 220, background data 222, configuration data 224, and report data 226. In the illustrated embodiment, the scenario data 210 and the flow data 212 includes information used by the flow manager 200 to coordinate the execution of a simulated scenario. FIG. 19 illustrates an example of flow data according to one embodiment. The scenario data 210 may include one or more conversation scripts, references to background images, and references to computer-simulated characters and positions of characters within a playground included within a simulation user interface. The flow data 212 may include a sequence of references to story scenes and scenarios. FIG. 9 illustrates an exemplary conversation script according to one embodiment.

Figure 20:
FIG. 20 is an illustration of simulated instant messaging provided by the simulation user interface component.

Conversation scripts instruct the conversation manager 206 to execute a simulated conversation with a member via a simulation user interface. The simulated conversation may include one or more computer-simulated characters (such as co-workers, supervisors, subordinates, customers, and vendors) who interact and converse with the member in a variety of settings using various communication channels (such as email, instant messaging, and simulated verbal interaction). The persona assumed by the computer-simulated characters may be fictitious or actual (e.g., a hypothetical co-worker or an actual co-worker of the member within the organization). FIG. 20 illustrates one example of simulated instant messaging according to one embodiment. In some embodiments, the simulated verbal interaction includes simulated speech communicated by the computer-simulated characters. The conversation manager 206 may render simulated speech as text or as audio output.

Figure 17:
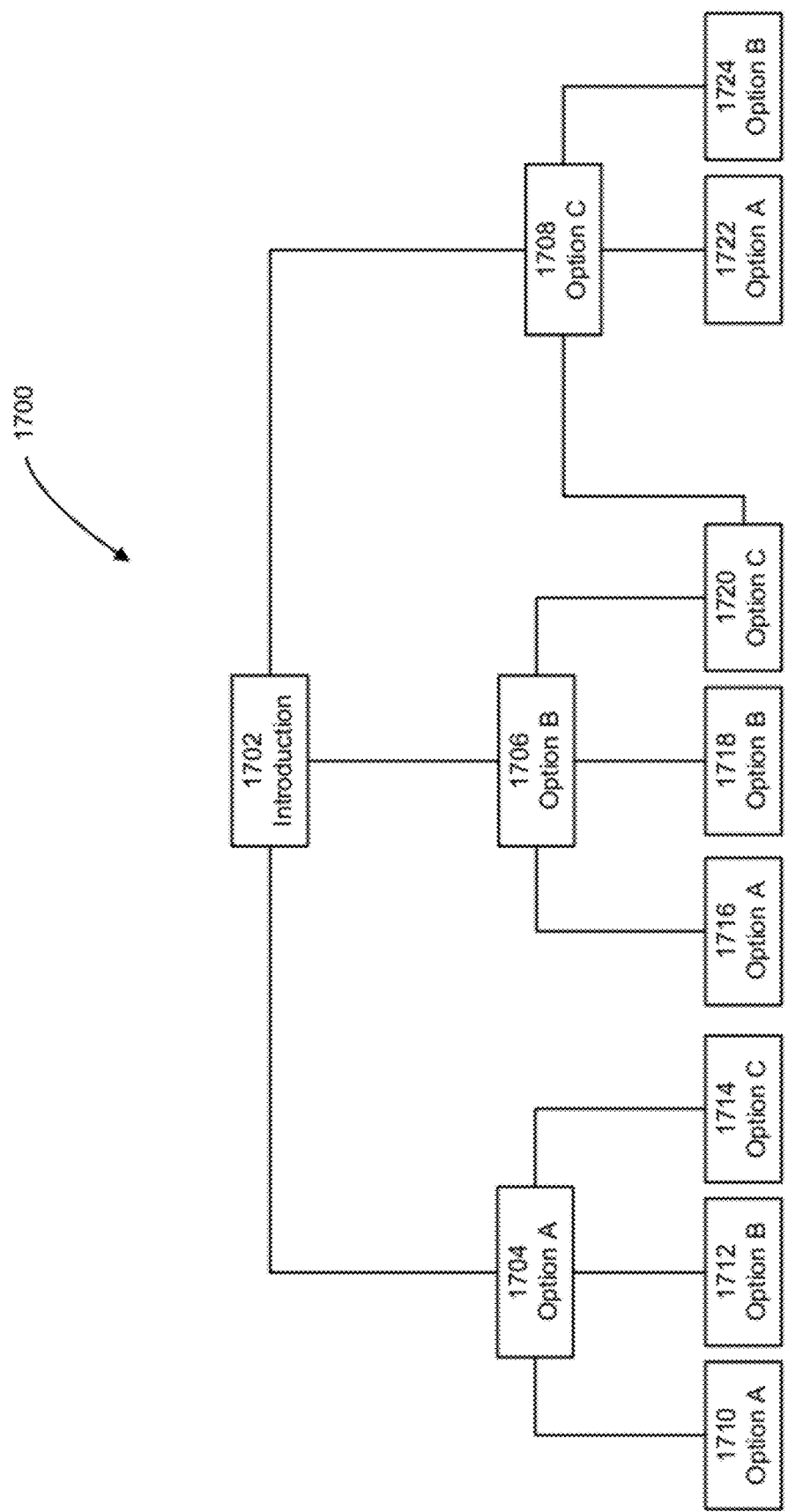
FIG. 17 is a block diagram illustrating the branch hierarchy of an exemplary conversation script.

In other embodiments, a conversation script may include a plurality of branches. FIG. 17 illustrates one example of such a conservation script. As shown in FIG. 17, the conversation script includes an introduction 1702. The introduction 1702 has three children: options 1704, 1706, and 1708. Each of the options 1704, 1706, and 1708 represents a discrete communication that may be simulated during execution of the conversation script 1700. Thus each of the options 1704, 1706, and 1708 may be selected by a member, and executed by the conversation manager 206, as part of a branch of the conversation script 1700. In addition, in some embodiments in accord with FIG. 17, each of the options 1704, 1706, and 1708 has three children. The option 1704 is the parent of options 1710, 1712, and 1714. The option 1706 is the parent of options 1716, 1718, and 1720. The option 1708 is the parent of options 1720, 1722, and 1724. Each of these options may be presented by the simulation interface, selected by the member, and executed by the conversation manager 206, as part of a branch of the conversation script 1700. As illustrated in the example of FIG. 17, the options available for execution by the conversation manager at any point within a conversation script may depend upon the options previously executed by the conversation manager 206. The conversation options executed within any particular conversation is referred to herein as a "path."

Figure 16:
FIG. 16 is an illustration of in-simulation feedback provided via the simulation user interface component.

In some embodiments, a conversation script, such as the conversation script 1700, may include one or more correct paths and one or more incorrect paths. In these embodiments, where the member selects, and the conversation manager 206 executes, an option on an incorrect path, the conversation manager 206 notifies the flow manager 200 of this event. In response to such a notification, the flow manager 200 may cause the transition manager 208 to provide in-simulation feedback to the member via the simulation user interface. This in-simulation feedback may take the form of a screen or other user interface element that indicates that an incorrect path has been taken. Further, in some embodiments, the in-simulation feedback includes information suggestive of the previously unselected and unexecuted option that is included in the correct path. FIG. 16 illustrates one example of a simulation user interface presenting in-simulation feedback. As shown in FIG. 16, the in-simulation feedback is displayed in area 1600.

In other embodiments, if the member selects, and the conversation manager 206 executes, an option on the correct path, the conversation manager 206 may notify the flow manager 200 of this event and may continue executing the conversation.

In some embodiments, the story scene data 214 includes information descriptive of scenes to be displayed during simulated scenarios. The story scene data 214 may include one or more movie files. The competency data 216 includes information descriptive of the performance of members (or users) during assessments performed by the competency management system 100 and information descriptive of feedback received via the feedback engine 128. The session data 218 includes information specifying the progress of members within one or more scenarios and may include members' progress along one or more paths. The character data 220 includes information descriptive of computer-simulated characters presented during scenarios. The character data 220 may include one or more image files. The background data 222 includes information descriptive of simulated backgrounds presented during scenarios. The background data 222 may include one or more image files, such as PNG image files. The report data 226 includes information generated by the report engine 130 that is used to render the various reports disclosed herein.

The configuration data 224 includes information that configures components included in the competency management system 100, such as the report engine 130 and the feedback engine 128. There are many examples of configuration data described above with reference to the administrator interface 126, the manager interface 124, and the member interface 122. Some of examples of configuration data include: organizational structures, roles, permissions granted to members or other organizational units; feedback configuration information including information descriptive of the members and competencies for which feedback information should be collected, the frequency with which assessment of a competency is planned and requested by the feedback engine 128, and whether the feedback engine 128 should start, pause, or stop collection of feedback information; team information including information descriptive of a team, members who constitute a team, the manager of the team, the company to which the team belongs, or the department (or other organizational units) to which the team belongs; member information including information descriptive of a member (e.g., an employee), such as the name, logon credentials, roles associated with the member, and stored assessment information (e.g., progress made through one or more scenarios); competency configuration information may include information descriptive of any a competency within the overall competency model of the organization, the roles with which the competency is associated and the targeted proficiency levels for the competency within each associated role; and report configuration information including information descriptive of any report generated by the reporting engine 130, such as members authorized to run or view a report, scheduled report generation, and report options.

As also shown in FIG. 2, the assessment engine 132 includes a flow manager 200, a background manager 204, a conversation manager 206, and a transition manager 208. Prior to initiating the simulation, the assessment engine 132 issues a request to the member interface 122 to initialize a playground within a simulation user interface. In some embodiments, the playground is an area within an HTML document through which the simulation is rendered and through which the member interface 122 receives information indicative of user actions.

In some embodiments, the assessment engine 132 next executes the flow manager 200. The flow manager 200 is configured to execute the simulation according to the flow data 212 by requesting display of story scenes in the playground and by executing scenarios through coordination of the background manager 202, the character manager 204, the conversation manager 206, and the transition manager 208. In some embodiments, the story scenes subject to display requests issued by the flow manager 200 include Adobe Flash SWF, PNG, and JPG files stored in the story scene data 214.

According to some embodiments, the flow manager 200 is configured to receive and process information descriptive of the conversation path being executed by the conversation manager 206. This information may include information indicating that the conversation manager 206 has executed options included on a correct path or an incorrect path. In response to receiving this information, the flow manager 200 stores information reflective of the received information in the session data 218 and the competency data 216.

As described above with reference to FIG. 17, in some embodiments, where the flow manager 200 receives information indicating that an option on an incorrect path was executed by the conversation manager 206, the flow manager 200 may cause the transition manager 208 to provide in-simulation feedback via a user interface. In some of these embodiments, the flow manager 200 may track the number of incorrect options executed within a conversation and may limit the number of incorrect options executed within a conversation to a predefined threshold. In at least one embodiment, should the number of incorrect options executed exceed the predefined threshold, the flow manager 200 discontinues execution of the conversation script by conversation manager 206.

In other embodiments, where the flow manager 200 receives information indicating that a correct path was executed by the conversation manager 206, the flow manager 200 may store information reflecting the correctly executed path within the session data 218 and the competency data 216. Furthermore, the flow manager 200 may cause the transition manager 208 to provide an indication, via a user interface, that the conversation was successfully completed. This indication may include the presentation of one or more badges that denote display of a particular competency.

In the embodiment illustrated in FIG. 2, the transition manager 208 is configured to display on screen modals at the beginning and end of a scenario, at the end of the simulation, and in some instances during execution of a scenario. The background manager 202 is configured to retrieve background art used in the scenario from the scenario data 210 and request display of the background art (e.g., image files, such as PNG and JPEG files) in the playground. The character manager 204 is configured to retrieve character art used in the scenario from the scenario data 210 and request display of the character art in the playground. The conversation manager 206 is configured to retrieve a conversation script used in the scenario from the scenario data 210 and request that items included in the conversation script be rendered in the playground.

In some embodiments, individual conversation scripts may be associated with, and designed to evaluate, one or more competencies. In addition, conversation scripts have a type attribute that specifies the communication channel (e.g., direct, email, instant message) and may be associated with one or more characters. In some embodiments, items are portions of a conversation. Attributes of an item include text (for direct and instant message conversation scripts), an email subject, an email body, a plurality of potential responses that each correspond to a response competency score, etc. In one embodiment, the response competency scores are expressed as "high," "medium," and "low." In other embodiments, the response competency scores are expressed using numeric values. One example of a simulation process performed by the flow manager 200 is described further below with reference to FIG. 10.

In other embodiments, the assessment engine 132 is configured to calculate an overall score for one or more competencies evaluated within a scenario. In these embodiments, the assessment engine 132 aggregates the overall score from the response competency scores received during execution of the scenario. The overall scores may be any statistical summary of the response competency scores, including a sum, average, weighted average, mode, etc. In some embodiments, the assessment engine 132 calculates the overall score using the first response competency score received for any given item. In other embodiments, the assessment engine 132 calculates the overall score using the last response competency score received for any given item.

In some embodiments, the assessment engine 132 calculates the overall score as a weighted average of the response competency scores. In these embodiments, the weights used reflect the importance to the conversation of the response associated with the response competency score. For example, response competency scores associated with responses provided to items presented later in a conversation may be allocated more weight in calculating the overall score.

According to one example, the assessment engine 132 assigns a default numeric value of 1 for "low" scores, 3 for "medium" scores, and 5 for "high" scores. In this embodiment, the assessment engine 132 shifts the numeric values for response competency scores associated with responses provided later in conversations to 3 for "low," 5 for "medium," and 7 for "high." Similarly, the assessment engine 132 shifts the numeric values for response competency scores associated with responses provided earlier in the conversations to –1 for "low," 1 for "medium," and 3 for "high." In this way, the assessment engine 132 calculates an overall score that is weighted by the importance of responses to a particular conversation.

Returning to FIG. 1, within the server computer 102, the feedback engine 128 exchanges information with the data storage 134, the reporting engine 130, the network 116, and the network 118. The feedback engine 128 is configured to request and receive feedback information regarding one or more competencies from members associated with another member and store information reflecting the feedback information in the data storage 134. As explained above with regard to the competency manager user interface, the competencies that are the subject of the feedback information may be different from the competencies assessed by the assessment engine 132. In some embodiments, the feedback request is transmitted as an email communication that includes information indicating the competency for which feedback is requested, feedback options indicating the proficiency of the member with in indicated competency, and an actionable element configured to submit the selected feedback option responsive to the actionable element being actuated. FIG. 18 illustrates an exemplary feedback email. As shown in FIG. 18, the feedback options available for selection include "Do much less," "Do less," "Perfect! Stay the same," "Do more," and "Do much more."

As discussed above in reference to the administrator interface 126, in some embodiments the frequency with which feedback engine 128 requests feedback is configurable. For example, the feedback engine 128 may be configured to request feedback on a daily, weekly, semi-monthly, monthly, quarterly, semi-annually, and annually basis. In some embodiments, the feedback engine 128 may be configured to request feedback according to a schedule that is specific to an identified competency of an indentified member.

The information stored by the feedback engine 128 within the data storage 134 may be later used by the reporting engine 130 to create report information for rendering into a report by a user interface component or sent via by an email. This information may include the date the feedback request was sent, the date the feedback request was responded to, the member who provided the feedback information, the member who is the subject of the feedback information, the competency that is the subject of the feedback information, and a selected feedback option that characterizes the proficiency of the subject member in the subject competency. In some embodiments, this feedback report will not include the identity of the members that provided feedback and this information will be kept anonymous from the member view the report. An example of one feedback process executed by the feedback engine 128 is described below with reference to FIG. 12.

In other embodiments, the feedback engine 128 is configured to automatically identify members from whom to request feedback. In some of these embodiments, the feedback engine 128 requests feedback from members based on their organizational relationship to the member being assessed. For example, in one embodiment, the feedback engine 128 requests feedback from subordinates of the member being assessed. In another embodiment, the feedback engine 128 requests feedback from peers of the member being assessed. In still another embodiment, the feedback engine 128 requests feedback from the supervisor of the member being assessed.

Information within the competency management system 100, including data within the data storage 134 may be stored in any logical construction capable of holding information on a computer readable medium including, among other structures, file systems, flat files, indexed files, hierarchical databases, relational databases or object oriented databases.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Embodiments disclosed herein are not limited to the particular configuration illustrated in FIG. 1. Various embodiments may implement the components described above using a variety of hardware components, software components and combinations of hardware and software components. In addition, various embodiments may utilize additional components configured to perform the processes and functions described herein. For instance, in at least one embodiment, the computer systems 102, 104, 106, and 108 are computer systems as described below with reference to FIG. 3. In other embodiments, the computer systems 102, 104, 106, and 108 are implemented as distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
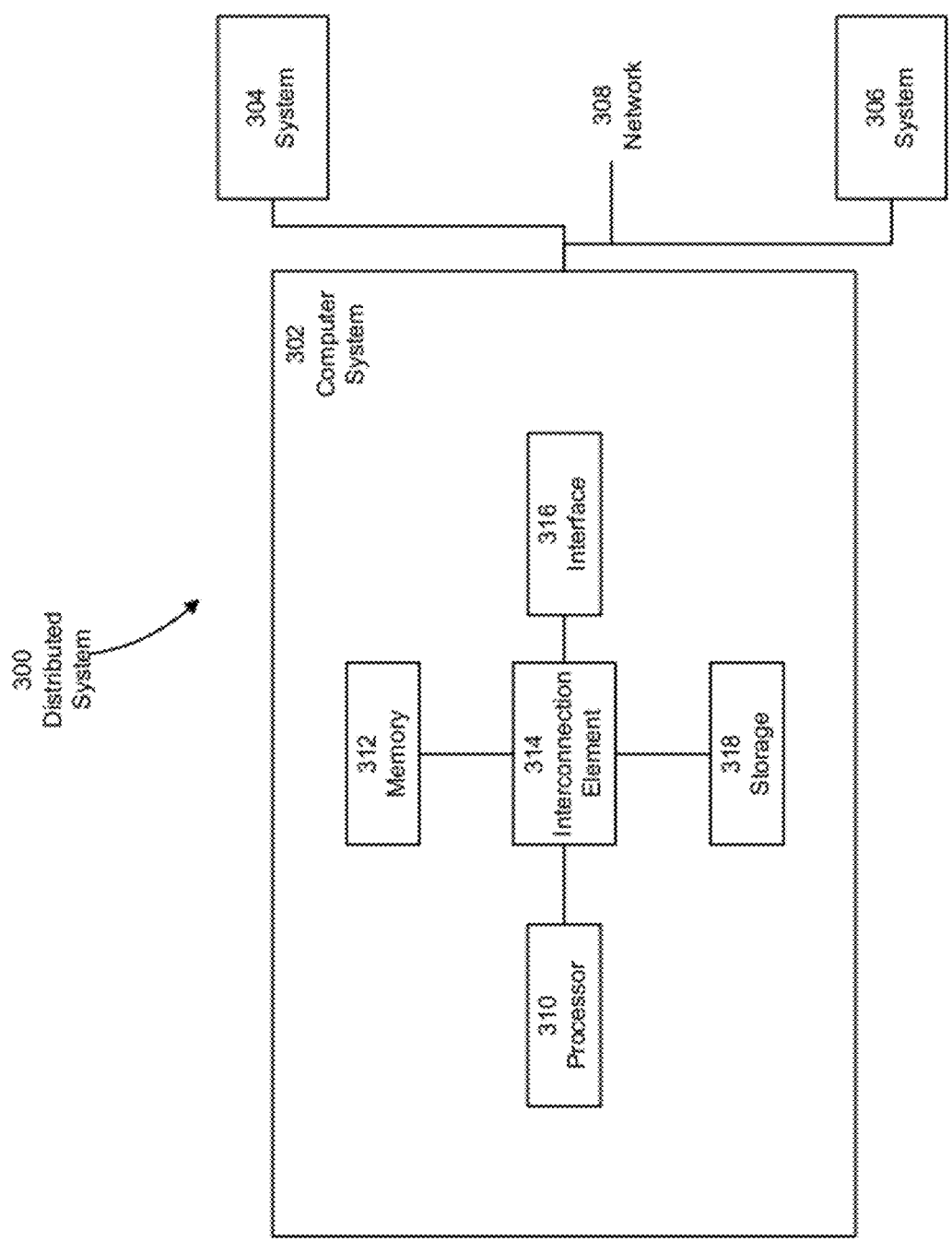
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, an interconnection element 314, an interface 316 and data storage element 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, an Apple A5, a Sun UltraSPARC or IBM Power5+ processor and an IBM mainframe chip. The processor 310 is connected to other system components, including one or more memory devices 312, by the interconnection element 314.

The memory 312 stores programs and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the interconnection element 314. The interconnection element 314 may include one or more physical busses, for example, busses between components that are integrated within a same machine, but may include any communication coupling between system elements including specialized or standard computing bus technologies such as IDE, SCSI, PCI and InfiniBand. The interconnection element 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage element 318 includes a computer readable and writeable nonvolatile, or non-transitory, data storage medium in which instructions are stored that define a program or other object that is executed by the processor 310. The data storage element 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage element 318. The memory may be located in the data storage element 318 or in the memory 312, however, the processor 310 manipulates the data within the memory, and then copies the data to the storage medium associated with the data storage element 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Competency Management Processes

Figure 10:
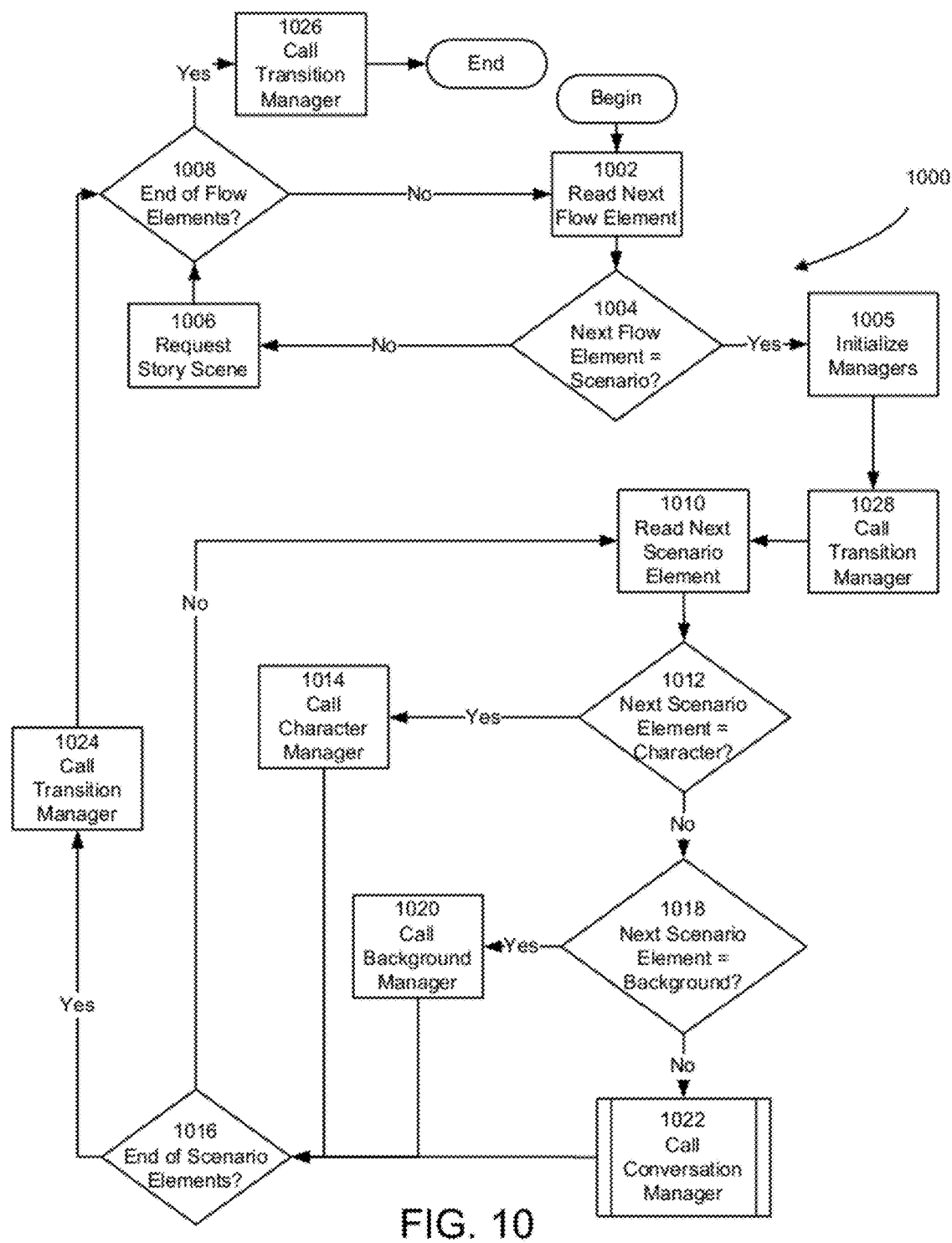
FIG. 10 is a flow diagram illustrating a process of executing a simulation.

As described above with reference to FIG. 2, some embodiments perform processes that execute simulations to access competencies using a distributed system, such as the competency management system 100. One example of such a simulation process is illustrated in FIG. 10. According to this example, the simulation process 1000 includes several acts which are described further below.

In act 1002, a next element of flow data, such as the flow data stored in the flow data 212 described above with reference to FIG. 2, is read. In one embodiment, a flow management component, such as the flow manager 200 described above with reference to FIG. 2, reads the next element of flow data from a data storage, such as the data storage 134 described above with reference to FIG. 2. In act 1004, the flow manager determines whether the next element of flow data describes a scenario. If so, the flow manager executes act 1005. Otherwise, the next element of flow data references a story scene, and the flow manager executes act 1006.

Figure 24:
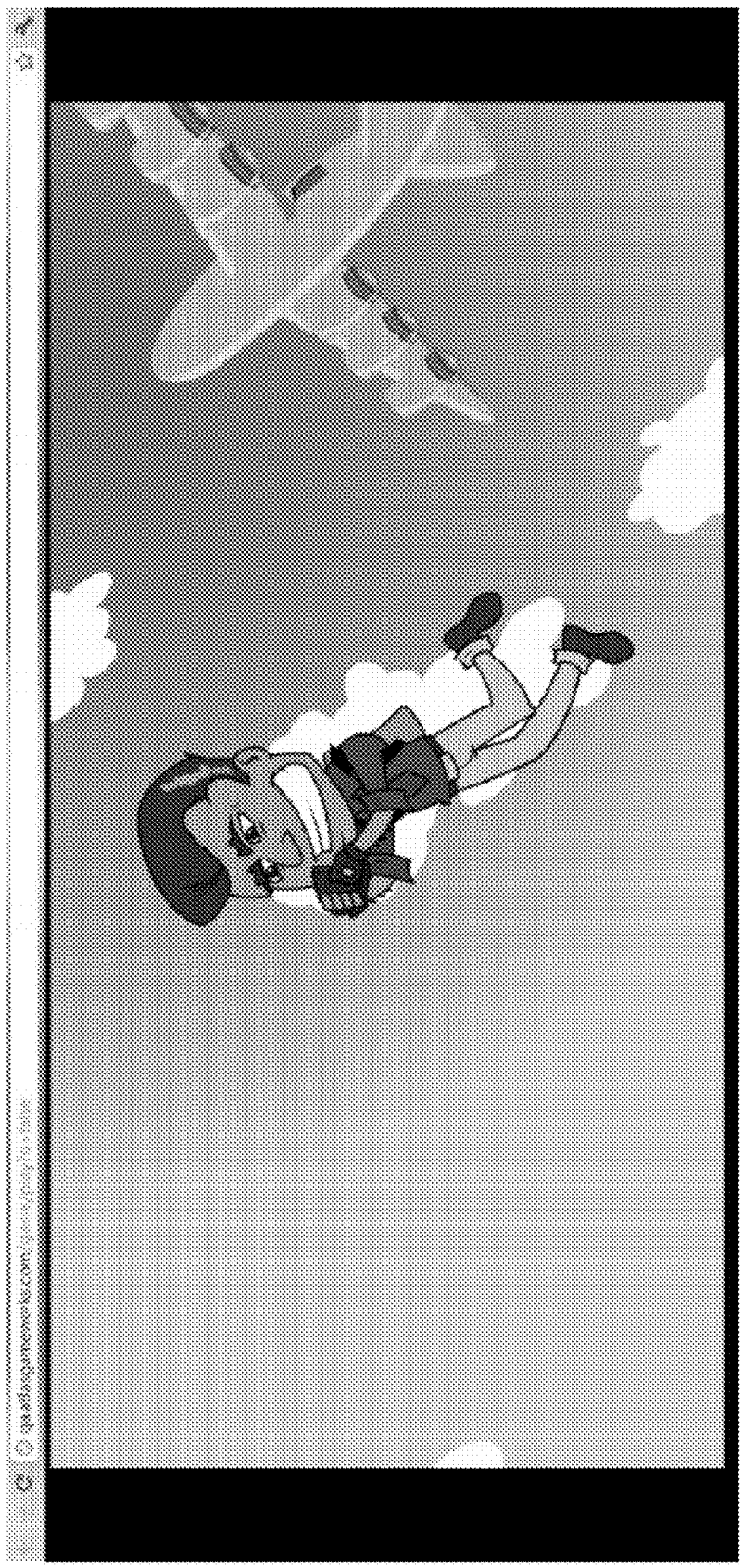
FIG. 24 is an illustration of a story scene provided via the simulation user interface component.

In the act 1006, the flow manager requests that a story scene referenced within the next flow element be served by a member interface, such as the member interface 122 described above with reference to FIG. 1 for rendering within a simulation user interface. In response to this request, the member interface downloads a movie file corresponding to the store scene referenced in within the next flow element. The member interface may retrieve the movie file from the story scene data 214 described above with reference to FIG. 2. Next, the simulation user interface displays the movie file within a playground, such as the playground described above. FIG. 24 illustrates on example of the simulation user interface displaying one frame of a movie file.

In the act 1005, the flow manager initializes the manager components used to execute a scenario. This initialization process may include execution of a transition manager, such as the transition manager 208 described above with reference to FIG. 2, a character manager, such as the character manager 204 described above with reference to FIG. 2, a background manager, such as the background manager 202 described above with reference to FIG. 2, and a conversation manager, such as the conversation manager 206 described above with reference to FIG. 2.

Figure 21:
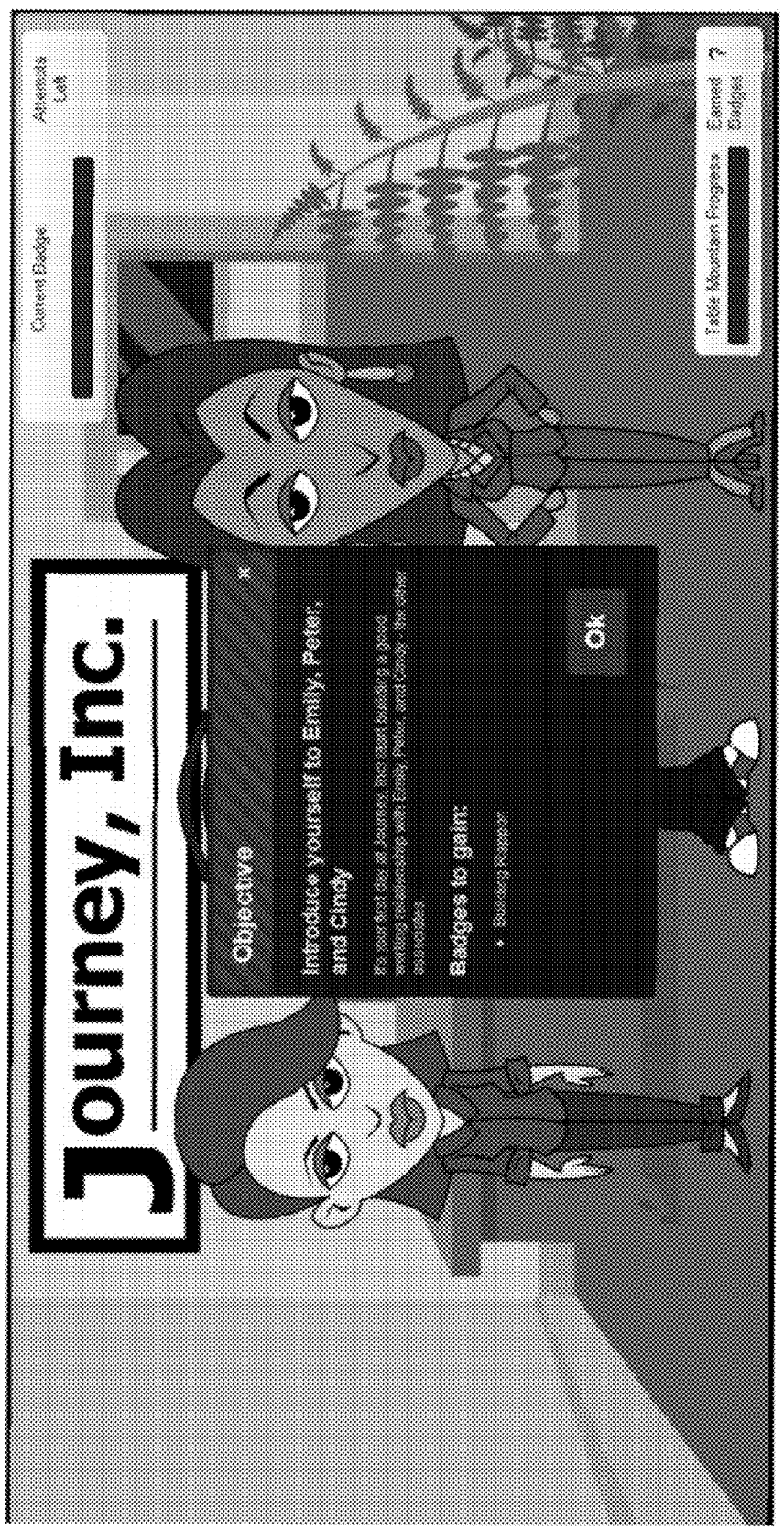
FIG. 21 is an illustration of an introductory portion of a simulation provided by the simulation user interface component.

In the act 1028, the flow manager calls the transition manager and passes the next element of flow data and an indication that a scenario is starting to the transition manager. Responsive to receiving the next element of flow data and the indication, the transition manager parses the next element of flow data and requests that a name and description of the scenario referenced within the next flow element be served by the member interface for rendering within the simulation user interface. In response to this request, the member interface transmits information descriptive of the name and description to the simulation user interface. The member interface may retrieve the name and description of the scenario from the scenario data 210 described above with reference to FIG. 2. Next, the simulation user interface displays the name and description of the scenario within the playground. FIG. 21 illustrates one example of the simulation user interface displaying information descriptive of the "Building Rapport" scenario.

In the act 1010, the flow manager reads the next element of scenario data from the scenario referenced in the next element of flow data. The flow manager may read the scenario data from the scenario data 210 described above with reference to FIG. 2. In act 1012, the flow manager determines whether the next element of scenario data references a character. If so, the flow manager executes the act 1014. Otherwise, the flow manager executes act 1018.

In the act 1014, the flow manager calls the character manager and passes the next element of scenario data to the character manager. The character manager, in turn, parses the next element of scenario data and requests that a character referenced within the next scenario element be served by the member interface for rendering within the simulation user interface. In response to this request, the member interface downloads an image file corresponding to the character referenced in within the next scenario element. The member interface may retrieve the image file from the character data 220 described above with reference to FIG. 2. Next, the simulation user interface displays the image file within the playground according to the location and other characteristics specified in the next scenario element.

In act 1018, the flow manager determines whether the next element of scenario data references a background. If so, the flow manager executes the act 1020. Otherwise, the flow manager executes act 1022.

In the act 1020, the flow manager calls the background manager and passes the next element of scenario data to the background manager. The background manager, in turn, parses the next element of scenario data and requests that a background referenced within the next scenario element be served by the member interface for rendering within the simulation user interface. In response to this request, the member interface downloads an image file corresponding to the background referenced in within the next scenario element. The member interface may retrieve the image file from the background data 222 described above with reference to FIG. 2. Next, the simulation user interface displays the image file within the playground according to the location and other characteristics specified in the next scenario element.

In the act 1022, the flow manager calls the conversation manager and passes the next element of scenario data to the conversation manager. The conversation manager, in turn, parses the next element of scenario data and exchanges information with the member interface to iteratively execute a conversation script, which prescribes one or more interactions. One example of a conversation script execution process performed by the conversation manager is illustrated below with reference to FIG. 11. Prior to executing the conversation script, the conversation manager may retrieve the conversation script from the scenario data 220 described above with reference to FIG. 2.

In act 1016, the flow manager determines whether additional scenario elements exist within the scenario referenced in the next element of flow data. If so, the flow manager executes the act 1010. Otherwise, the flow manager executes act 1024.

Figure 23:
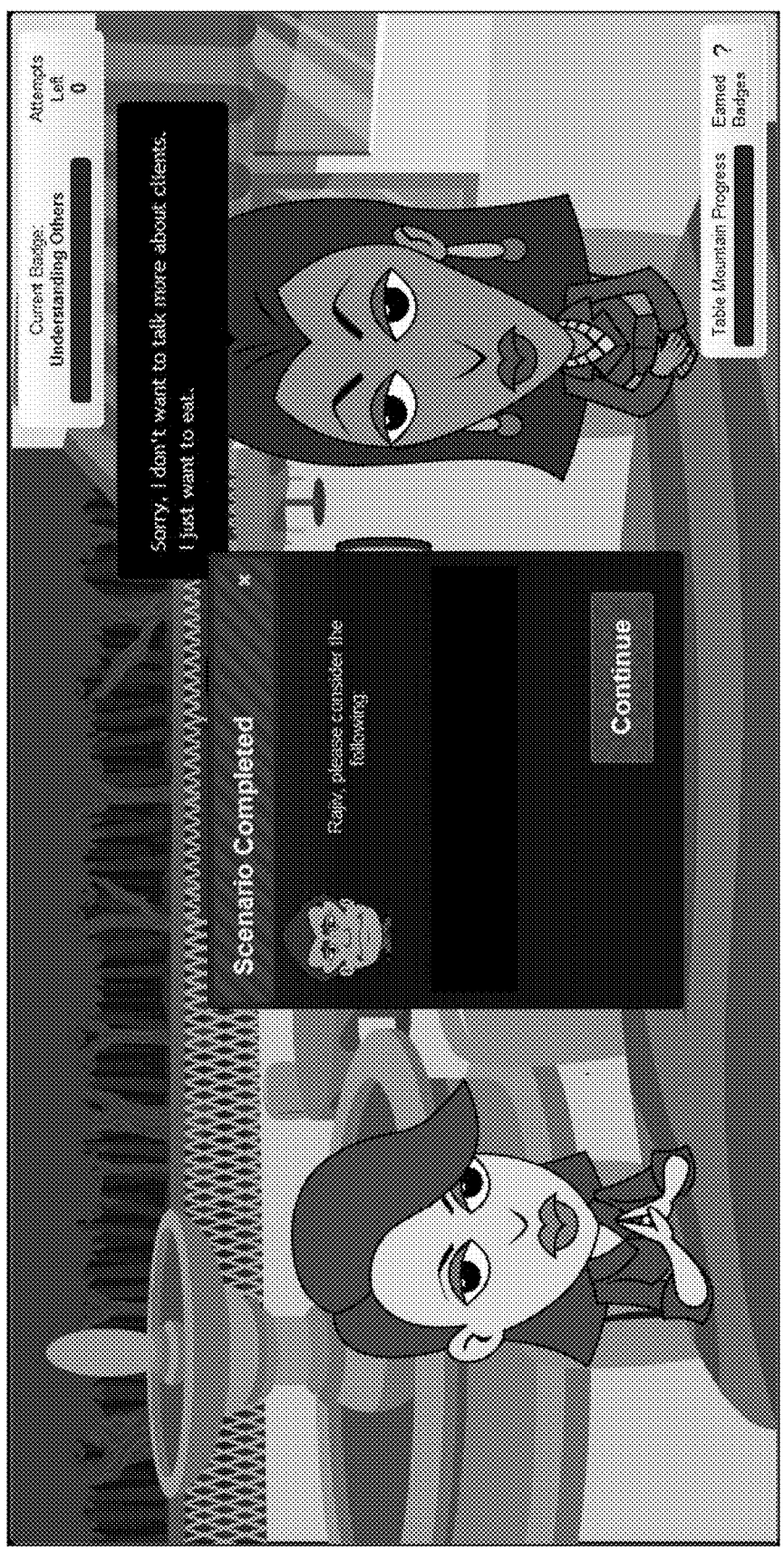
FIG. 23 is an illustration of an ending portion of a scenario within a simulation provided by the simulation user interface component.

In the act 1024, the flow manager calls the transition manager and passes a reference to display information associated with the scenario and an indication that a scenario is ending to the transition manager. This display information may include, for example, an overall score associated with the scenario. Responsive to receiving the reference to display information and the indication, the transition manager requests that the display information be served by the member interface for rendering within the simulation user interface. In response to this request, the member interface transmits the display information to the simulation user interface. The member interface may retrieve the display information from the competency data 216 described above with reference to FIG. 2. Next, the simulation user interface displays display information within the playground. FIG. 23 illustrates one example of the simulation user interface presenting display information indicating that the "Understanding Others" scenario is complete.

In the act 1008, the flow manager determines whether additional flow elements exist within the flow data corresponding to the currently executing simulation. If so, the flow manager executes the act 1002. Otherwise the flow manager executes act 1026 and terminates the simulation process 1000.

Figure 22:
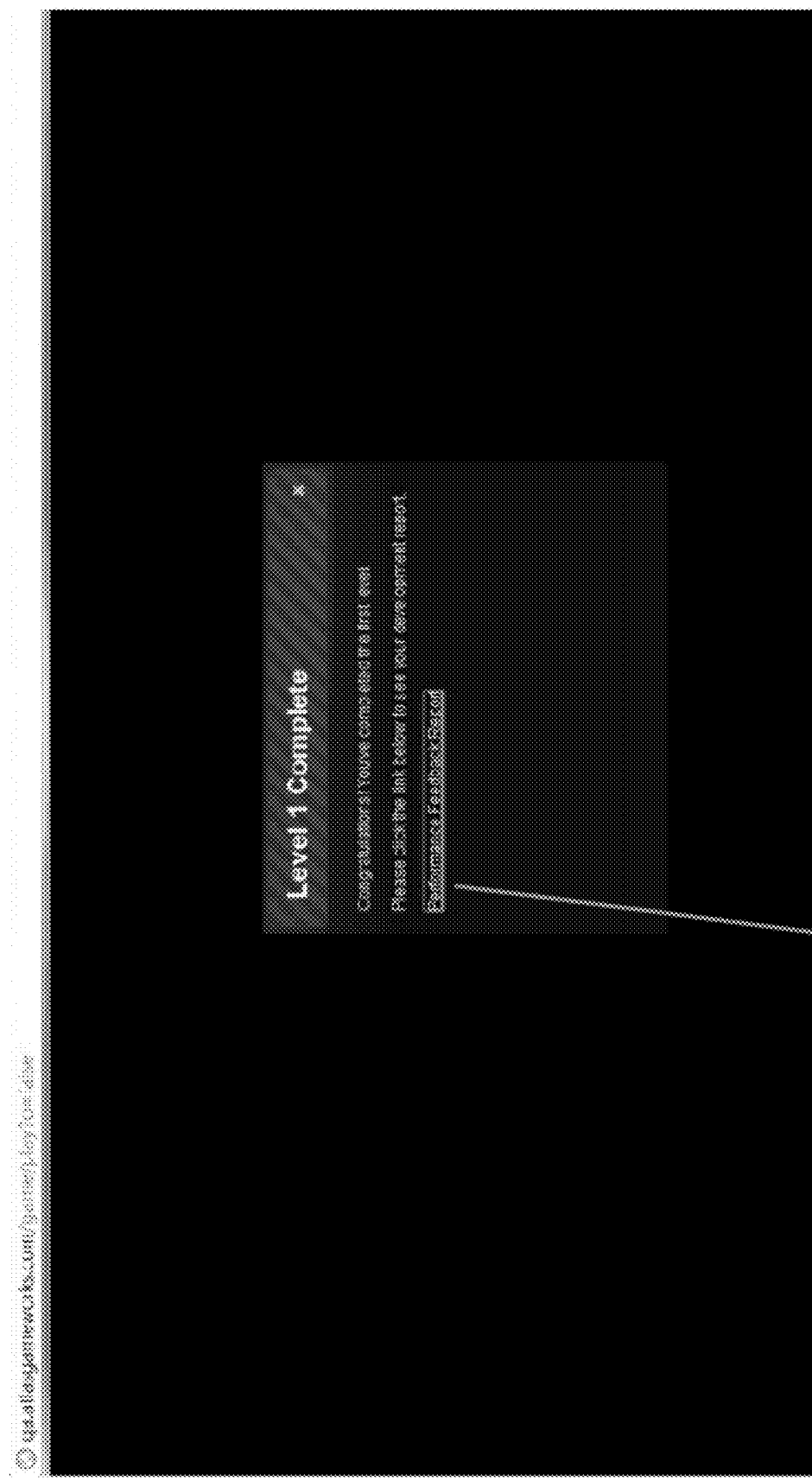
FIG. 22 is an illustration of an ending portion of a simulation provided by the simulation user interface component.

In the act 1026, the flow manager calls the transition manager and passes an indication that the simulation is ending to the transition manager. Responsive to receiving the indication, the transition manager requests that a notification be served by the member interface for rendering within the simulation user interface. In response to this request, the member interface transmits information descriptive of the notification to the simulation user interface. Next, the simulation user interface displays the notification within the playground. In addition, in some embodiments, during execution of the act 1026, the transition manager causes the competency management system to transmit an email to the member. The email may include a link to a user interface that renders one or more reports that provide competency information gathered during the simulation. FIG. 22 illustrates one example of the simulation user interface displaying a notification that the "Level 1" simulation is ending. As shown in FIG. 22, the notification includes a link 2200 to a user interface configured to display a performance feedback report in accord with the performance feedback report described above with reference to FIG. 7.

Processes such as the simulation process 1000 provide several advantages over conventional simulation processes. For instance, by distributing processing between multiple components, the simulation process 1000 increases the scalability of the system, as separate and specialized hardware may be used to execute the components.

Figure 11:
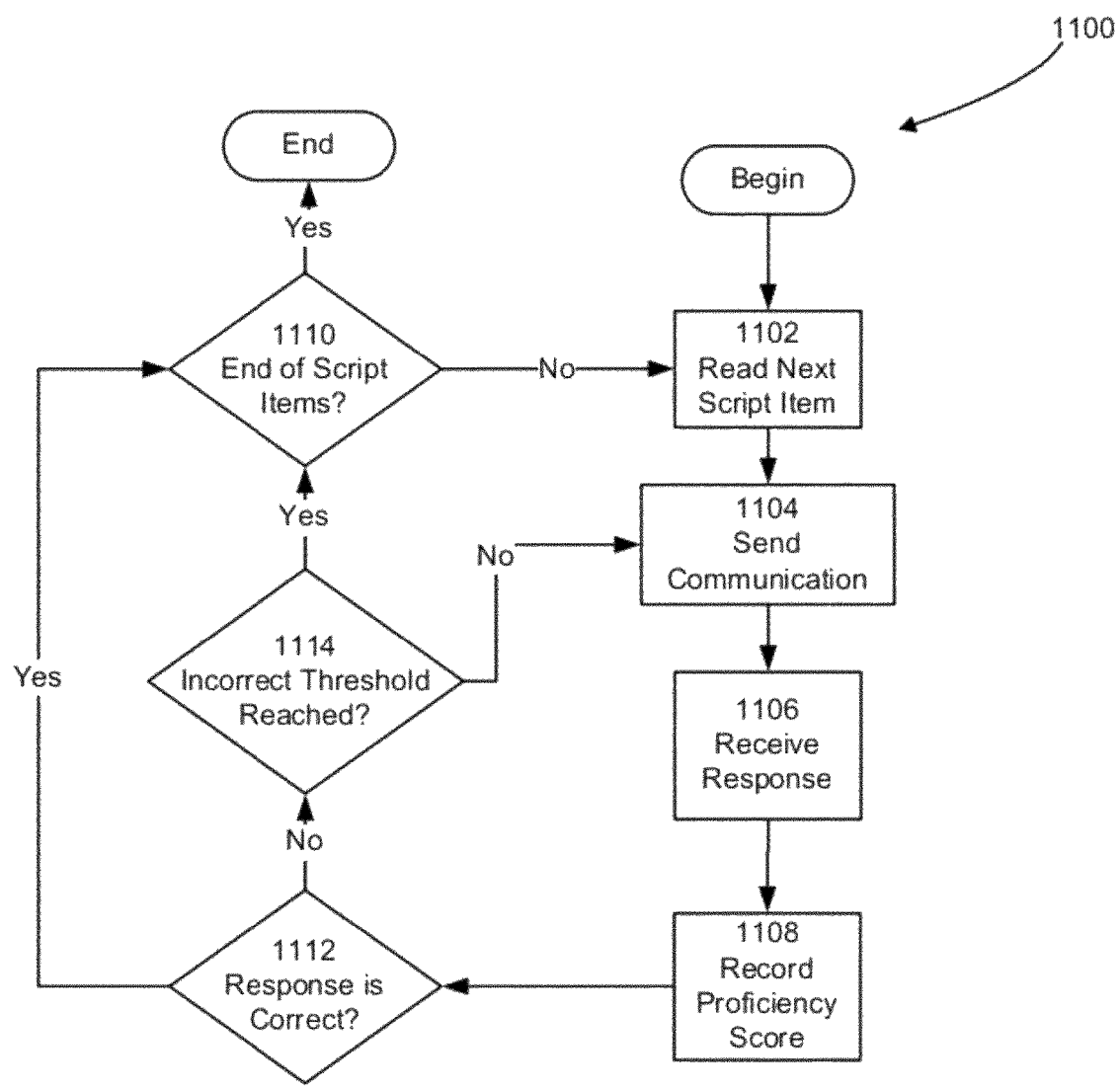
FIG. 11 is a flow diagram illustrating a process of executing a conversation.

As described above with reference to act 1022 illustrated in FIG. 10, some embodiments perform processes that simulate interactions by executing conversation scripts using a distributed system, such as the competency management system 100. One example of such a script execution process is illustrated in FIG. 11. According to this example, the script execution process 1000 includes several acts which are described further below.

In act 1102, a conversation manager, such as the conversation manager 206 described above with reference to FIG. 2, reads a next script item from a conversation script, such as one of the conversation scripts stored in the scenario data 210 described above with reference to FIG. 2. In act 1104, the conversation manager requests the next script item be served by a member interface, such as the member interface 122 described above with reference to FIG. 1 for rendering within a simulation user interface, such as the simulation user interface described above. In response to this request, the member interface transmits information descriptive of the next script item to the simulation user interface. Next, the simulation user interface displays the next script item within a playground, such as the playground described above.

In act 1106, the conversation manager receives a response from the simulation user interface via the member interface. The response may contain information descriptive of a selection made by a member conducting the simulation. In act 1108, the conversation manager stores the option indicated in the response, competency information reflecting the response received, and session information reflecting that the member has answered the next script item. The conversation manager may store the competency information within the competency data 216 and the session (and path) information in the session data 218, both of which are described above with reference to FIG. 2.

In act 1112, the conversation manager requests that in-simulation feedback tailored to the incorrect response be served by the member interface for rendering within the simulation user interface. In response to this request, the member interface transmits information descriptive of the in-simulation feedback to the simulation user interface. Next, the simulation user interface displays the in-simulation feedback within the playground.

Also as part of the act 1112, the conversation manager determines whether the response received was correct. In some embodiments, a response is recorded correct where the response option included in the response is associated with a "high" response competency score. In other embodiments, a response is recorded as correct where the response option included in the response is associated with a "high" or "medium" response competency score. If the response is correct, the conversation manager executes act 1110. Otherwise, the conversation manager executes act 1114.

In the act 1114, the conversation manager determines whether the number of incorrect responses received for an item has reached a pre-defined, configurable threshold parameter. If so, the conversation manager presents the next item by executing the act 1110. Otherwise, the conversation manager presents the current item again by executing the act 1104.

In the act 1110, the conversation manager determines whether additional items exist within the conversation script currently being executed. If so, the conversation manager executes the act 1102. Otherwise, the conversation manager terminates the script execution process 1100.

Processes such as the script execution process 1100 provide several advantages over non-scripted approaches. For instance, by executing the simulation according to a script, competencies may be tested in methodical, rigorous, and standardized fashion. In addition, scripts may be created by trained professionals and may iteratively adjust such that some script items are presented only if particular previous answers were selected.

Figure 12:
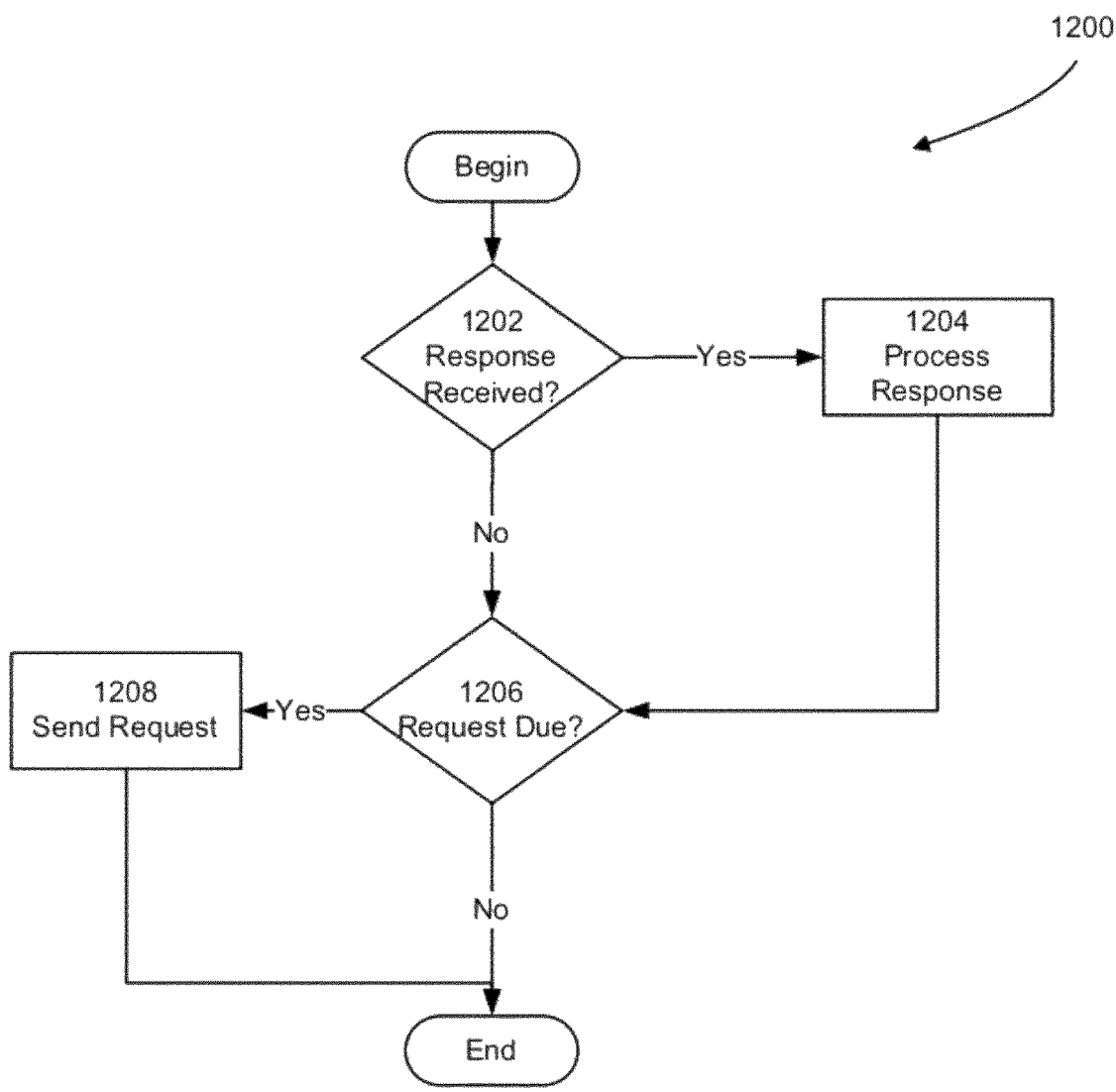
FIG. 12 is a flow diagram illustrating a process of generating feedback information.

As described above with reference to FIG. 1, some embodiments perform processes that request, receive, and process feedback information using a distributed system, such as the competency management system 100. One example of such a feedback process is illustrated in FIG. 12. According to this example, the feedback process 1200 includes several acts which are described further below.

In act 1202, a feedback engine, such as the feedback engine 128 described above with reference to FIG. 1, determines whether any unprocessed responses to previously issued feedback requests are available for processing. If so, the feedback engine executes act 1204. Otherwise, the feedback engine executes act 1206.

In the act 1204, the feedback engine parses the response and stores within competency data, such as the competency data 216, feedback information reflective of the information included in the response. In some embodiments, the feedback information stored such that the anonymity of the feedback provider is protected.

In the act 1206, the feedback engine determines whether a feedback request is due to be issued. If so, the feedback engine executes act 1208. Otherwise, the feedback engine terminates the feedback process 1200.

In the act 1208, the feedback engine sends a feedback request to one or more members as specified in configuration information associated with the member about whom feedback is requested. In some embodiments, the feedback request is transmitted in the form of an email. In other embodiments, the feedback is presented within a user interface provided by the competency management system.

Processes such as the feedback process 1200 provide several advantages over conventional approaches. For instance, such processes request feedback in a non-invasive manner, thereby causing reduced disruption to member normal activities. Furthermore, by supporting anonymous feedback, feedback processes such as the process 1200 enjoy increased participation and more candid feedback information than conventional approaches.

Processes 1000, 1100 and 1200 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a competency management system configured according to the examples and embodiments disclosed herein.

Exemplary Scenarios

In various embodiments, a competency management system, such as the competency management system 100 described above with reference to FIG. 1 assesses one or more competencies of a member during execution of a simulation. In at least one embodiment, the simulation is a game. The game includes a story which is based on a fictitious newly formed company named Journey, Inc. The company is formed on a fictitious world named Risa and its mission is to book vacations from Earth to Risa for its customers. The game's main characters are Max Powers, the owner of Journey, Inc and Mr. Payn, the owner of Risa Vacations, Journey's competitor.

In a first level, the member playing the game is a new associate employee at Journey, Inc. and has to work with existing and new colleagues to accomplish the company's mission. The member is given scenarios to complete and is shown story scenes between each scenario. In this embodiment, most scenarios involve conversing with employees and customers of the company and completing tasks on the planet such as booking vacations for customers. If the member selects the wrong response, a modal will appear displaying feedback on why that response was incorrect. In addition, feedback is given after each scenario is completed. FIG. 16 illustrates one example of user interface providing feedback after a scenario is complete. The content of the feedback will depend on the member's performance at completing the scenario. The member may also have to option to replay the scenario depending on their performance.

Figure 13:
FIG. 13 is an illustration of a portion of a simulation provided via a simulation user interface component.

One example scenario is designed to assess an "Understanding Others" competency. FIG. 13 presents an illustration of a user interface presented during execution of this scenario. As shown in FIG. 13, this scenario places the member in a situation where he or she has to communicate with other characters in the game. A conversation script is written specifically to measure the "Understanding Others" competency. According to this scenario, the character at the top right of FIG. 13 starts a discussion with the player. The player is presented with options regarding what to say to one or more of the other characters. Each character will respond based on the conversation script written for them and the option selected by the member being assessed. The scenario is complete when all conversations are over or the member chooses to discontinue the scenario. Each option presented within the scenario has an associated response competency score and the options selected are recorded. The response competency scores associated with the options are used as input into a formula which will be used to generate an overall proficiency score for the competency.

Figure 14:
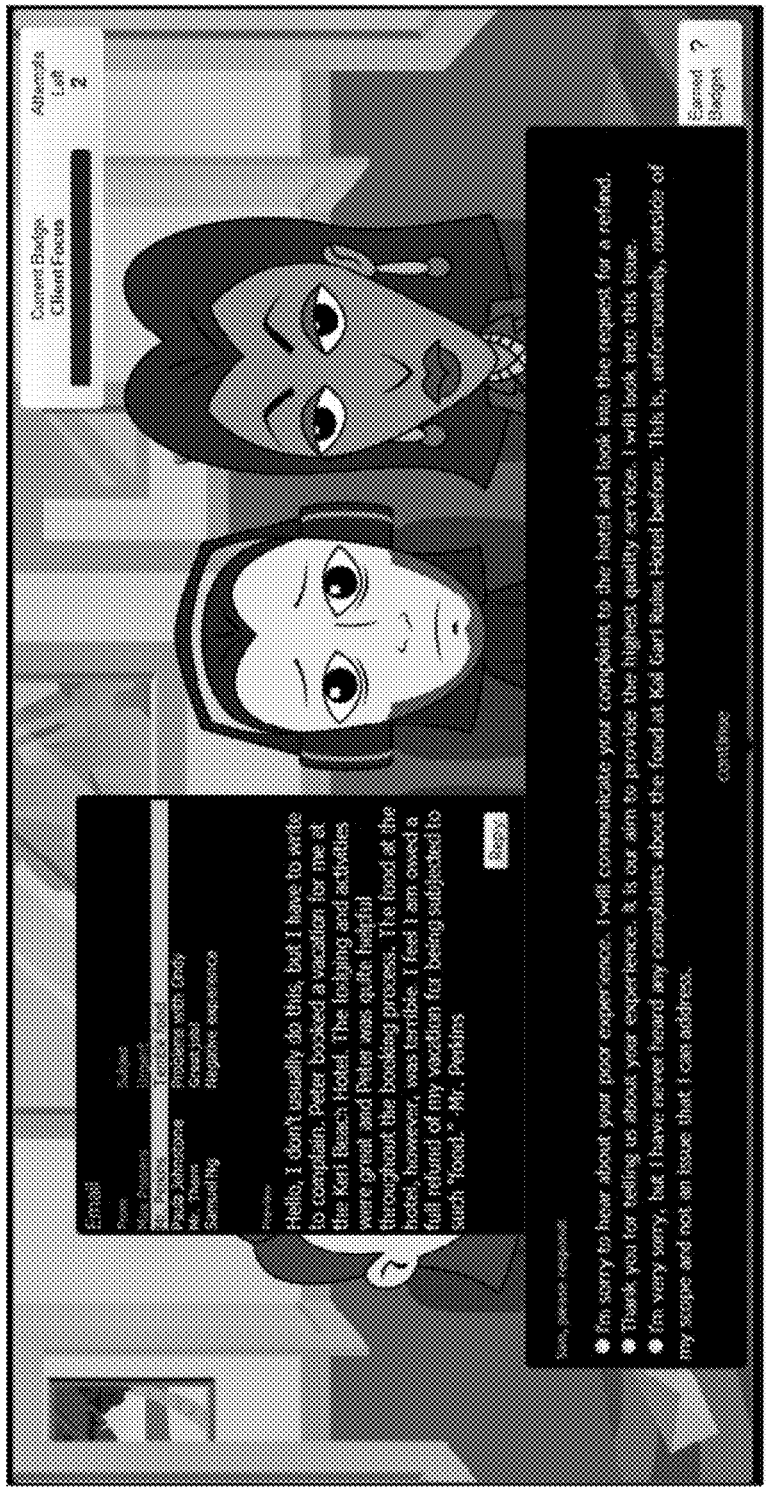
FIG. 14 is an illustration of another portion of the simulation provided via the simulation user interface component.

Another example scenario is designed to assess a "Customer Service" competency. FIG. 14 presents an illustration of a user interface presented during execution of this scenario. As shown in FIG. 14, this scenario places the member in a situation where the member must respond to customer service feedback emails. A conversation script is written specifically to measure the "Customer Service" competency. The member is given options for responding to individual emails. The customer may respond based on the option selected by the member according to the conversation script written for the customer. Each option presented within the scenario has an associated response competency score and the options selected are recorded. The response competency scores associated with the options are used as input into a formula which will be used to generate an overall proficiency score for the competency.

Figure 15:
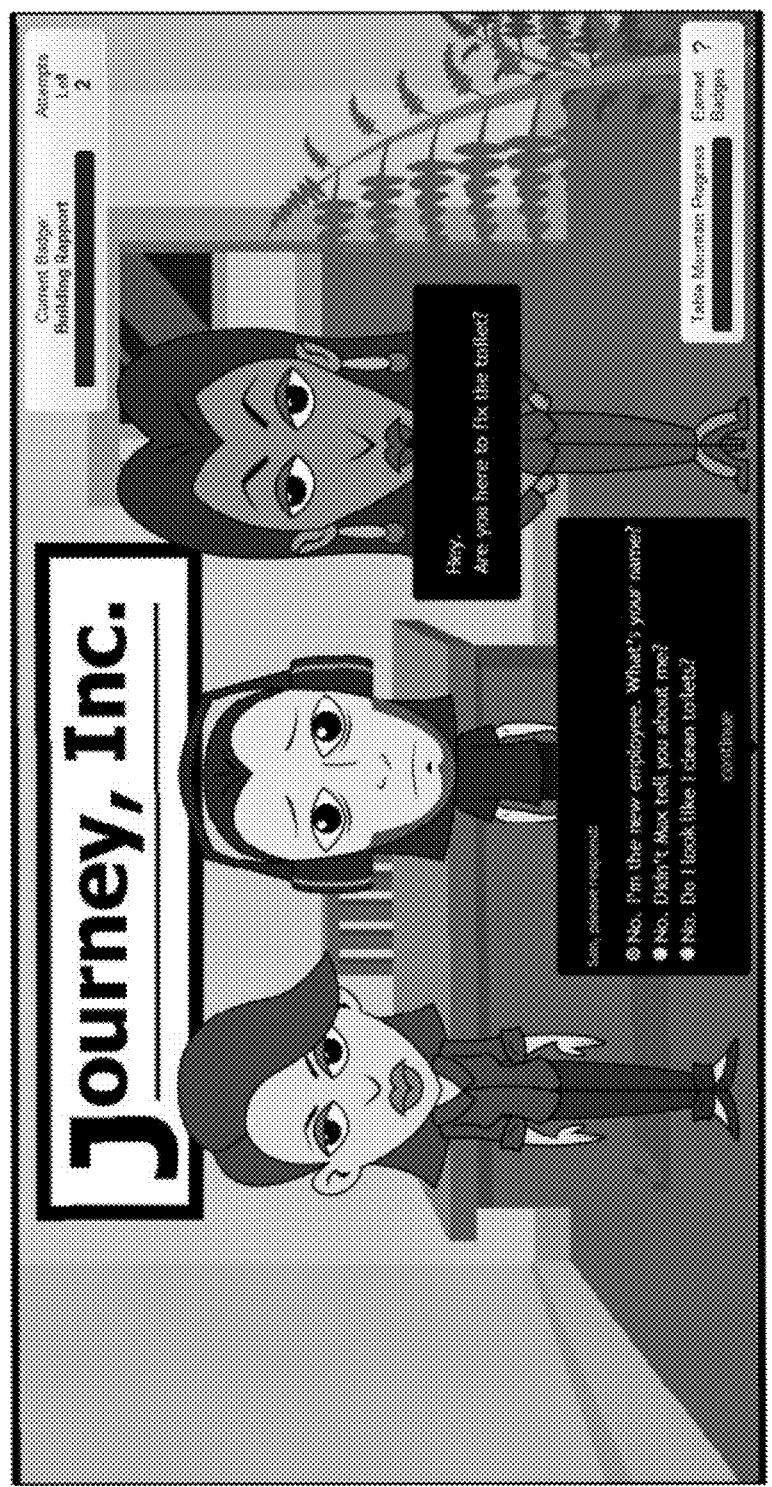
FIG. 15 is an illustration of a portion of another simulation provided via the simulation user interface component.

Another example scenario is designed to assess a "Building Rapport" competency. FIG. 15 presents an illustration of a user interface presented during execution of this scenario. As shown in FIG. 15, this scenario places the member in a situation where the member interacts with two other characters in the game. A conversation script is written specifically to measure the "Building Rapport" competency. In the beginning of the scenario, the first character starts talking. The member is presented with options to respond. The first character responds based on the conversation script written for the character and the option selected by the member. Each option presented within the scenario has an associated response competency score and the options selected are recorded. The response competency scores associated with the options are used as input into a formula which will be used to generate an overall proficiency score for the competency.

Another example scenario is designed to assess a "Coping with Pressure" competency. This scenario requires the member to complete one or more other scenarios simultaneously. The scenario will be actively executing (and therefore assessment occurring) without the game interface visually indicating that this is the case. In order to evaluate, the simulation will play music and will simulate a situation that will cause the player to seem pressured. It may also ask the player to complete tasks in a shorter than average amount of time. In this way, the member may not be aware that certain aspects of their behavior are being assessed. Recorded information, such as time and decisions made by the member, will be used to assess how well the member performed.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer system comprising:
a memory storing data descriptive of a plurality of dialogue options, each dialogue option of the plurality of dialogue options comprising conversational text used in two-way interpersonal communication;
a user interface comprising a display;
at least one processor coupled to the memory and the user interface; and
an assessment component for evaluating proficiency of at least one user within one or more competencies, the assessment component being executable by the at least one processor and configured to:
initiate an interactive scenario associated with the one or more competencies;
present, via the display as part of the interactive scenario, at least one computer-simulated character oriented to face the at least one user;
receive, from the at least one user via the user interface, input to start, as part of the interactive scenario, a conversation between the at least one user and at least one computer-simulated character;
start the conversation in response to receiving the input;
conduct the conversation to form a back and forth dialogue in which the at least one user converses with the at least one computer-simulated character via a plurality of responses selected from dialogue options of the plurality of dialogue options that are directed to the at least one computer-simulated character and the at least one computer-simulated character converses with the at least one user via communications directed to the at least one user via the display;
record a score for each response of the plurality of responses selected from the dialogue options of the plurality of dialogue options by the at least one user during the conversation, thereby recording a plurality of scores;
determine one or more overall scores for the one or more competencies based on the plurality of scores; and
determine one or more proficiency levels for the one or more competencies demonstrated by the at least one user based on the one or more overall scores.

2. The computer system according to claim 1, wherein the at least one computer-simulated character includes a plurality of computer-simulated characters.

3. The computer system according to claim 1, further comprising a report component executable by the at least one processor and configured to generate a report indicating the one or more proficiency levels.

4. The computer system according to claim 1, wherein the conversation comprises simulated speech rendered as at least one of text and audio.

5. The computer system according to claim 1, wherein the conversation comprises provision of the dialogue options.

6. The computer system according to claim 1, further comprising an administrative component executable by the at least one processor and configured to:
receive organizational information descriptive of an organizational structure including a plurality of members; and
receive competency information descriptive of competencies associated with at least one organizational unit.

7. The computer system according to claim 6, wherein the at least one user is a member of the plurality of members and the at least one computer-simulated character includes at least one of a co-worker, supervisor, subordinate, customer, and vendor.

8. The computer system according to claim 6, further comprising a feedback component executable by the at least one processor and configured to:
send a communication to a member of the plurality of members, the communication including information requesting feedback regarding at least one member; and
receive a response to the communication.

9. The computer system according to claim 8, wherein the feedback component is further configured to determine the member based on an organizational relationship between the member and the at least one member.

10. The computer system according to claim 8, wherein the response includes feedback information regarding at least one competency associated with the at least one member.

11. The computer system according to claim 8, wherein the response includes award information descriptive of an award recommended for the at least one member.

12. The computer system according to claim 1, wherein the conversation comprises at least one of a simulated email and a simulated instant message.

13. The computer system according to claim 1, wherein the assessment component is further configured to discontinue the conversation in response to a number of incorrect responses exceeding a predefined threshold.

14. The computer system according to claim 1, wherein the assessment component is further configured to pause the conversation in response to a user input and continue the conversation at a later time in response to another user input.

15. A method of evaluating proficiency of at least one user within one or more competencies using a computer system, the computer system comprising a display, the method comprising:
initiating, by the computer system, an interactive scenario associated with the one or more competencies;
presenting, by the computer system via the display as part of the interactive scenario, at least one computer-simulated character oriented to face the at least one user;
receiving, by the computer system from the at least one user, input to start, as part of the interactive scenario, a conversation between the at least one user and at least one computer-simulated character;
starting, by the computer system, the conversation in response to receiving the input;
conducting, by the computer system, the conversation to form a back and forth dialogue in which the at least one user converses with the at least one computer-simulated character via a plurality of responses selected from dialogue options of a plurality of dialogue options that are directed to the at least one computer-simulated character and the at least one computer-simulated character converses with the at least one user via communications directed to the at least one user via the display, each dialogue option of the plurality of dialogue options comprising conversational text used in two-way interpersonal communication;
recording a score for each response of the plurality of responses selected from the dialogue options of the plurality of dialogue options by the at least one user during the conversation, thereby recording a plurality of scores;

determining one or more overall scores for the one or more competencies based on the plurality of scores; and determining one or more proficiency levels for the one or more competencies demonstrated by the at least one user based on the one or more overall scores.

16. The method according to claim 15, wherein conducting the conversation includes conducting a conversation between the at least one user and a plurality of computer-simulated characters.

17. The method according to claim 16, further comprising generating a report indicating the one or more proficiency levels.

18. The method according to claim 16, further comprising:

receiving organizational information descriptive of an organizational structure including a plurality of members; and receiving competency information descriptive of competencies associated with at least one organizational unit.

19. The method according to claim 18, wherein the at least one user is a member of the plurality of members and wherein conducting the conversation includes conducting a conversation between the at least one user and at least one of a co-worker, supervisor, subordinate, customer, and vendor.

20. The method according to claim 18, further comprising:

sending a communication to a member of the plurality of members, the communication including information requesting feedback regarding at least one member; and receiving a response to the communication.

21. The method according to claim 20, further comprising determining the member based on an organizational relationship between the member and the at least one member.

22. The method according to claim 20, wherein receiving the response includes receiving feedback information regarding at least one competency of the at least one member.

23. The method according to claim 20, wherein receiving the response includes receiving award information descriptive of an award recommended for the at least one member.

24. The method according to claim 15, wherein conducting the conversation comprises rendering simulated speech as at least one of text and audio.

25. The method according to claim 15, wherein conducting the conversation comprises providing the dialogue options.

26. The method according to claim 15, wherein conducting the conversation includes conducting a conversation including at least one of a simulated email and a simulated instant message.

27. A non-transitory computer readable medium storing instructions for evaluating proficiency of at least one user within one or more competencies using a computer system comprising a display and at least one processor coupled to the display, the instructions encoded to instruct the at least one processor to:

initiate, an interactive scenario associated with the one or more competencies;

present, via the display as part of the interactive scenario, at least one computer-simulated character oriented to face the at least one user;

receive, from the at least one user, first input to start, as part of the interactive scenario, a conversation between the at least one user and at least one computer-simulated character;

start the conversation in response to receiving the first input;

conduct the conversation to form a back and forth dialogue in which the at least one user converses with the at least one computer-simulated character via a plurality of responses selected from dialogue options of a plurality of dialogue options that are directed to the at least one computer-simulated character and the at least one computer-simulated character converses with the at least one user via communications directed to the at least one user via the display, each dialogue option of the plurality of dialogue options comprising conversational text used in two-way interpersonal communication;

record a score for each response of the plurality of responses selected from the dialogue options of the plurality of dialogue options by the at least one user during the conversation, thereby recording a plurality of scores;

determine one or more overall scores for the one or more competencies based on the plurality of scores; and determine one or more proficiency levels for the one or more competencies demonstrated by the at least one user based on the one or more overall scores.

* * * * *